United States Patent
Pitschel et al.

(10) Patent No.: US 9,875,346 B2
(45) Date of Patent: Jan. 23, 2018

(54) SETTING AND TERMINATING RESTRICTED MODE OPERATION ON ELECTRONIC DEVICES

(71) Applicant: Apple Inc., Cupertino, CA (US)

(72) Inventors: Donald Walter Pitschel, San Francisco, CA (US); Maria Dimitrova Ioveva, Menlo Park, CA (US); Christopher Brian Fleizach, Santa Clara, CA (US); Elizabeth Caroline Furches Cranfill, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/683,093

(22) Filed: Apr. 9, 2015

(65) Prior Publication Data

US 2016/0232336 A1    Aug. 11, 2016

Related U.S. Application Data

(60) Provisional application No. 62/113,263, filed on Feb. 6, 2015.

(51) Int. Cl.
  *G06F 21/30*   (2013.01)
  *G06F 21/62*   (2013.01)

(52) U.S. Cl.
  CPC .......... *G06F 21/305* (2013.01); *G06F 21/629* (2013.01); *G06F 2221/2105* (2013.01); *G06F 2221/2137* (2013.01); *G06F 2221/2149* (2013.01)

(58) Field of Classification Search
  None
  See application file for complete search history.

(56) References Cited

U.S. PATENT DOCUMENTS

| | | | |
|---|---|---|---|
| 6,678,824 B1* | 1/2004 | Cannon ................. A63F 13/10 | 705/59 |
| 8,201,224 B1* | 6/2012 | Spertus ............... G06F 21/6218 | 713/153 |
| 8,812,994 B2 | 8/2014 | Seymour et al. | |
| 8,825,036 B2* | 9/2014 | Kemery ............. H04L 41/0816 | 455/418 |
| 9,129,135 B2* | 9/2015 | Hoefel .................. G06F 21/629 | |
| 9,270,760 B2* | 2/2016 | Heinberg ............ H04L 29/0653 | |
| 2003/0028622 A1* | 2/2003 | Inoue .................. G06F 21/6218 | 709/219 |

(Continued)

*Primary Examiner* — Michael R Vaughan
(74) *Attorney, Agent, or Firm* — Ronald Fernando

(57) ABSTRACT

A first electronic device is configured to operate in a restricted mode of operation, which restricted mode may be terminated or continued by one or more remotely located authorization devices, according to predetermined criteria. In a restricted mode, a first set of permitted applications stored on the first electronic device are executable, and a first set of data is accessible. While operating in the restricted mode, the first device detects a termination condition of the restricted mode and transmits an indication of the termination condition to one or more authorization devices. After transmitting the request, the first electronic device receives an indication that the restricted mode of operation has been continued according to predetermined criteria. Responsive to receiving the indication, the first electronic device continues to operate in the restricted mode according to the predetermined criteria.

23 Claims, 13 Drawing Sheets

(56) References Cited

U.S. PATENT DOCUMENTS

| | | | |
|---|---|---|---|
| 2006/0150240 A1* | 7/2006 | Robinson | H04L 63/0263 726/4 |
| 2009/0254656 A1* | 10/2009 | Vignisson | G06F 17/30867 709/224 |
| 2012/0210444 A1* | 8/2012 | Yabe | G09B 7/02 726/28 |
| 2014/0289866 A1* | 9/2014 | Beck | G06F 21/62 726/28 |
| 2014/0337997 A1* | 11/2014 | Beck | G06F 21/60 726/27 |
| 2014/0344951 A1* | 11/2014 | Brewer | G06F 3/0488 726/28 |
| 2015/0350215 A1* | 12/2015 | Shi | H04L 63/101 726/26 |

* cited by examiner

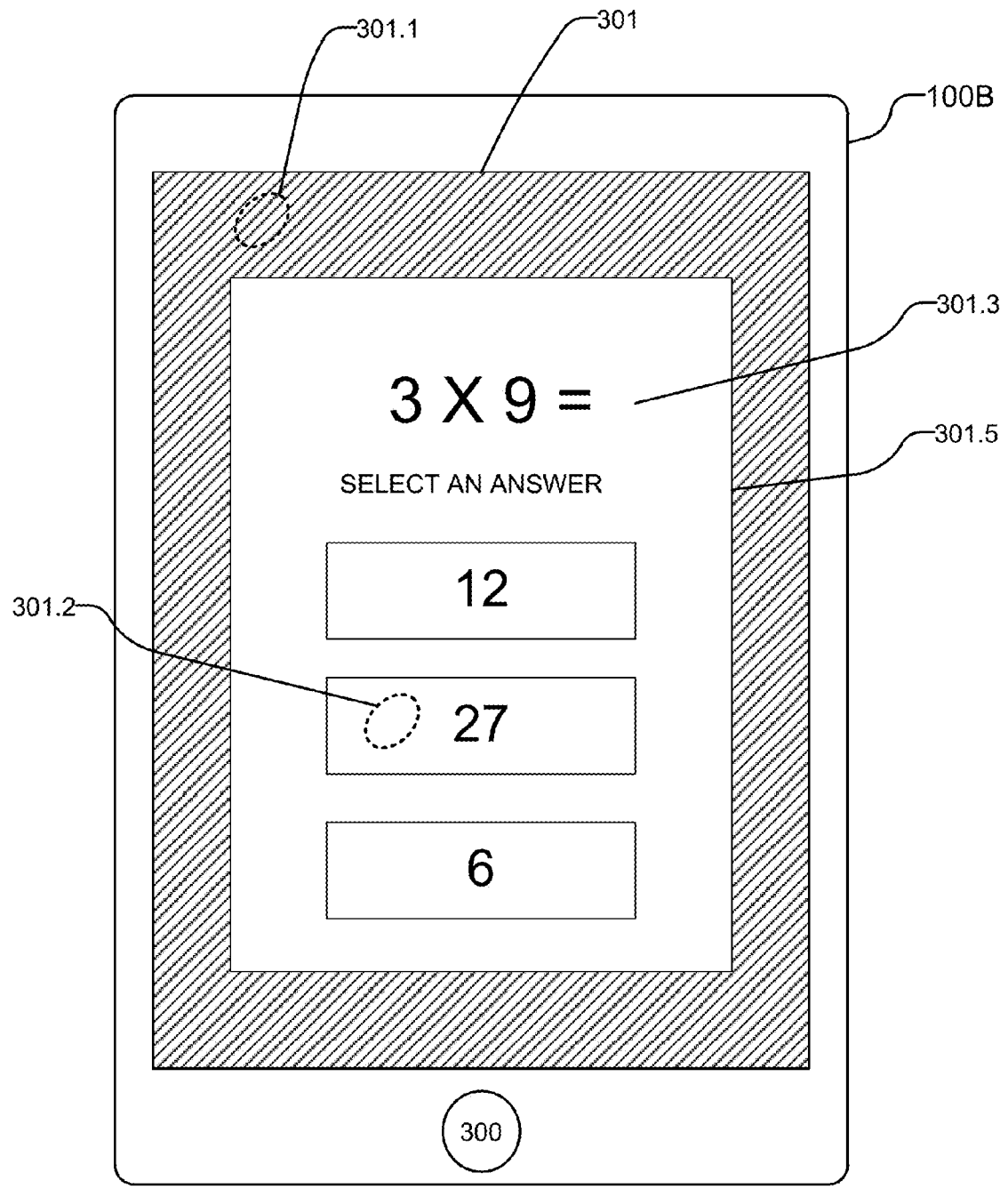
FIG. 3.1

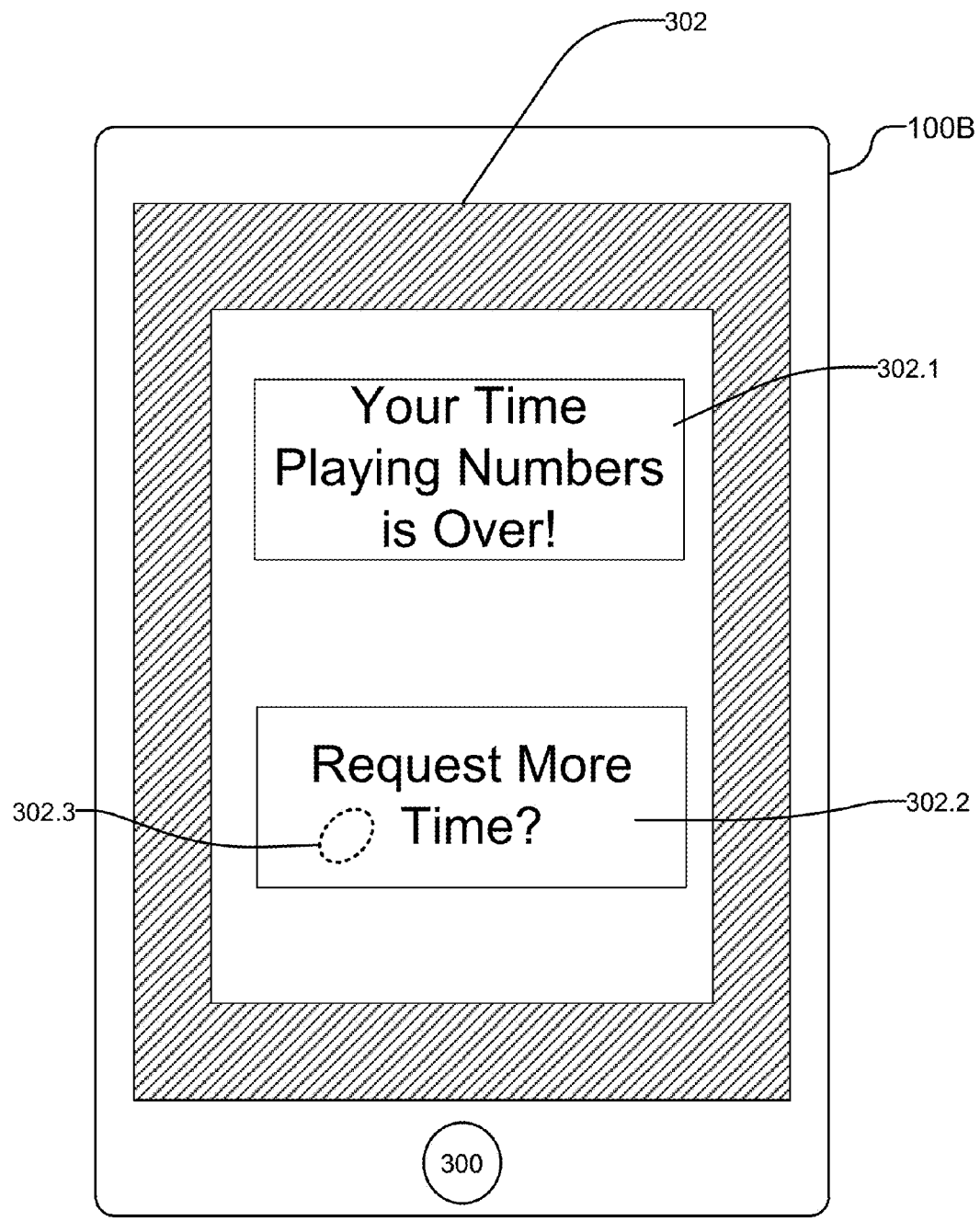
FIG. 3.2

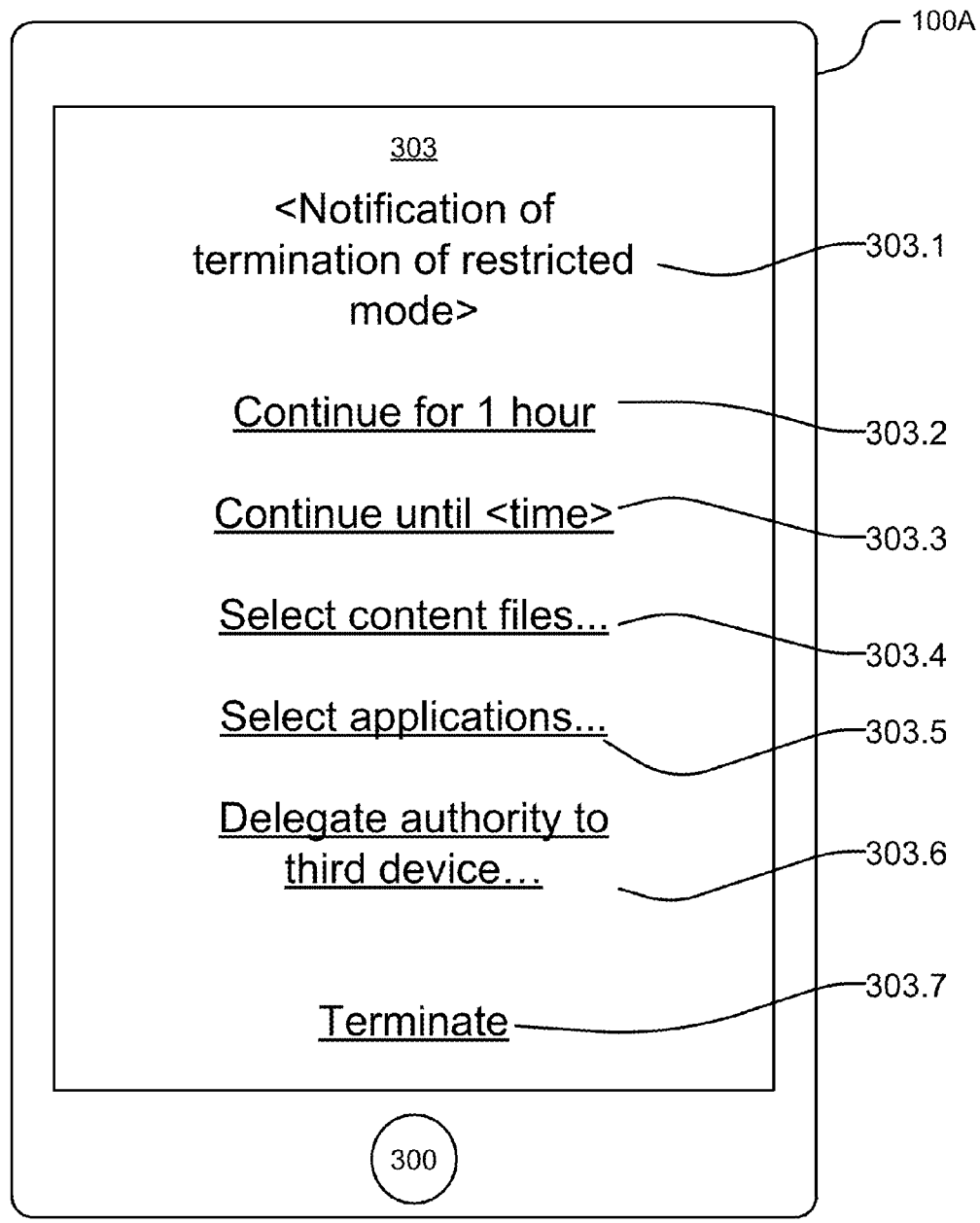
FIG. 3.3

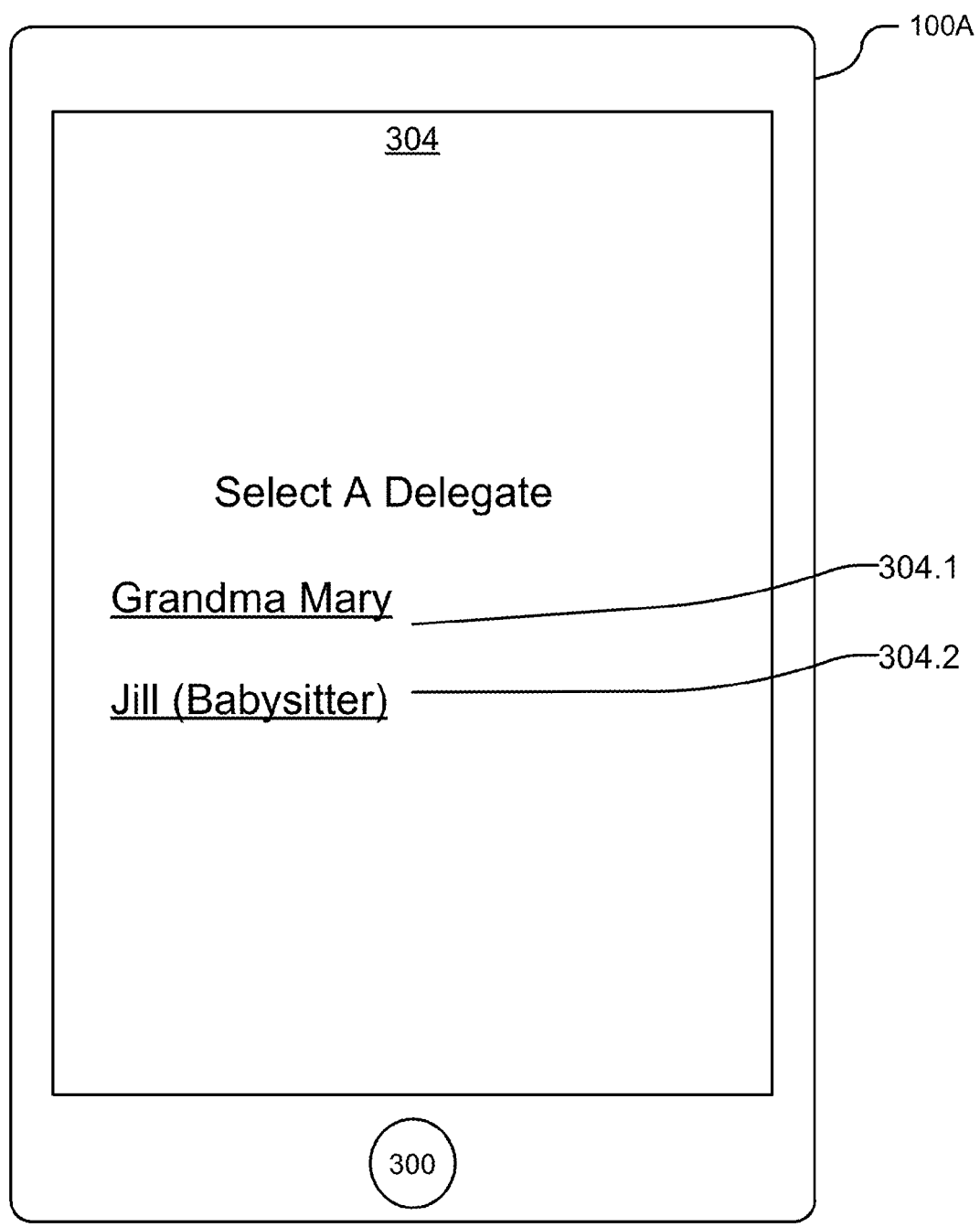
FIG. 3.4

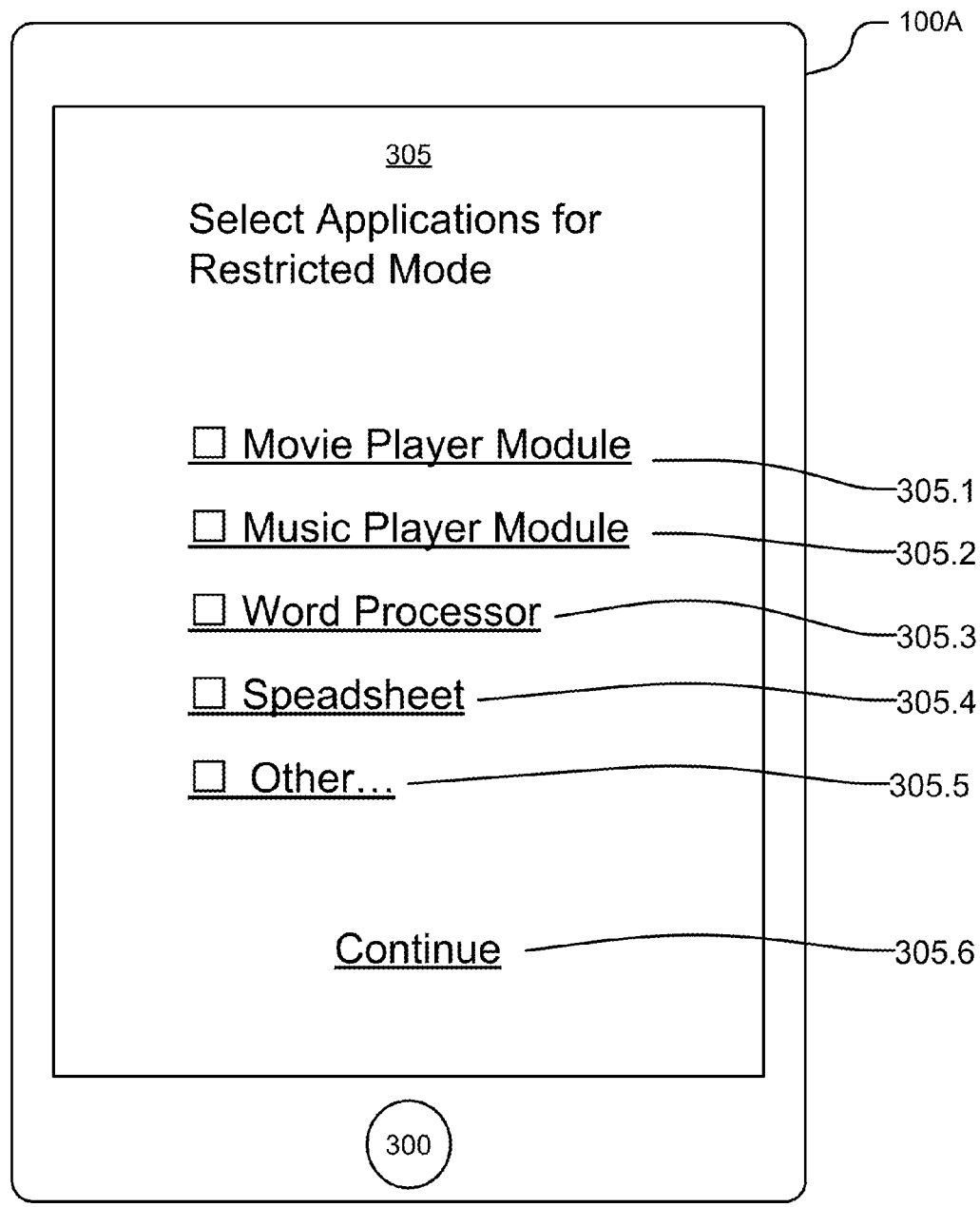
FIG 3.5

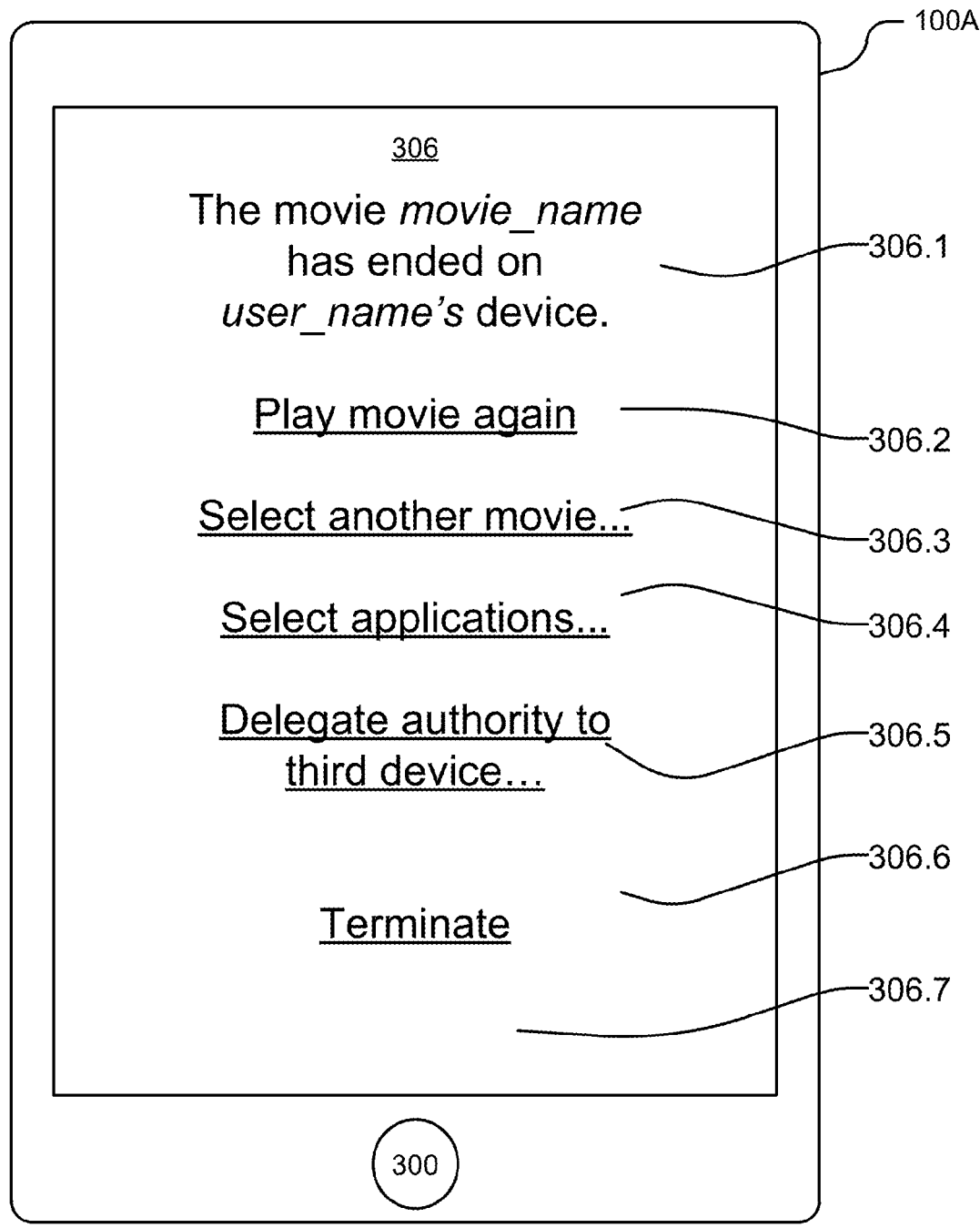
FIG. 3.6

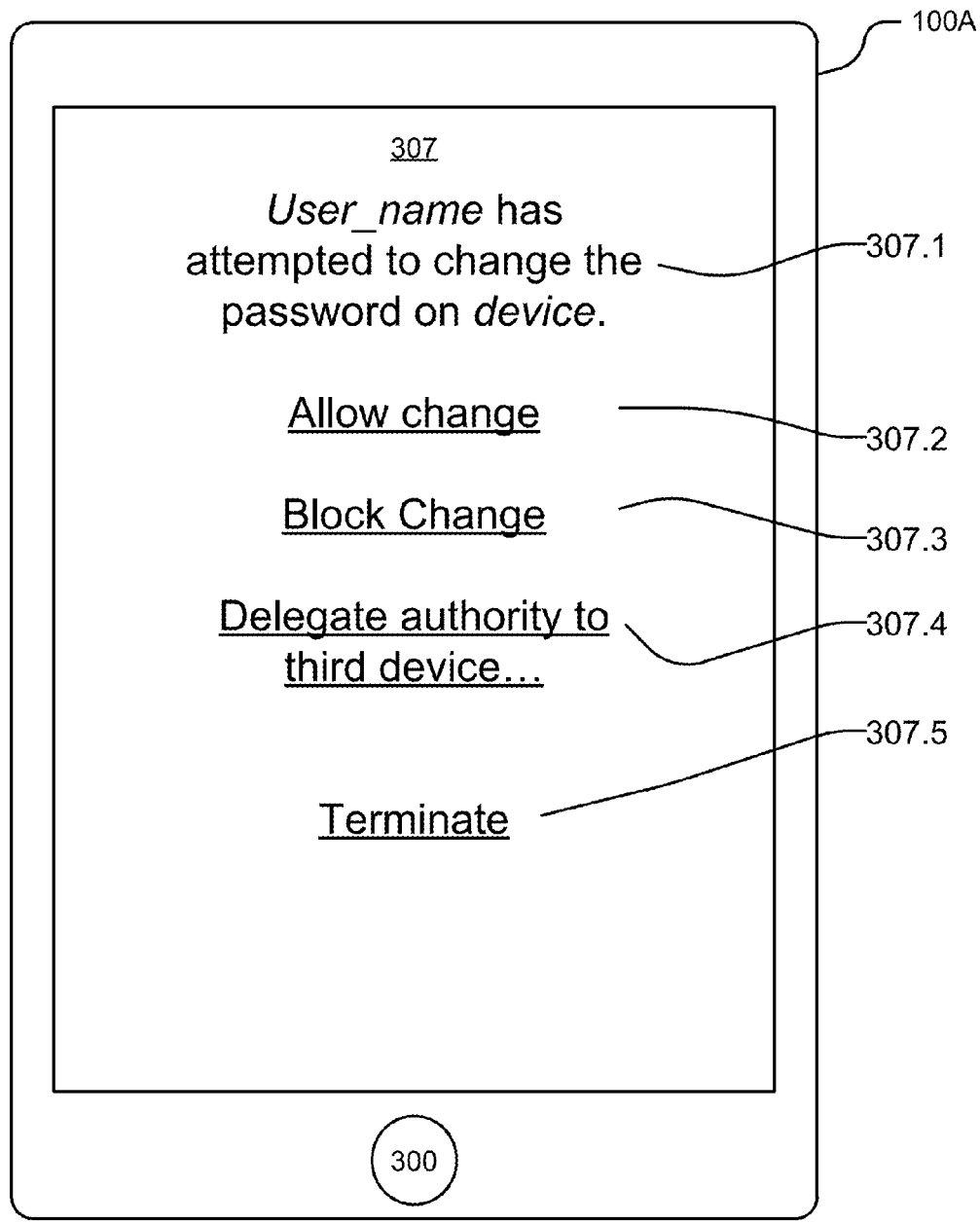
FIG. 3.7

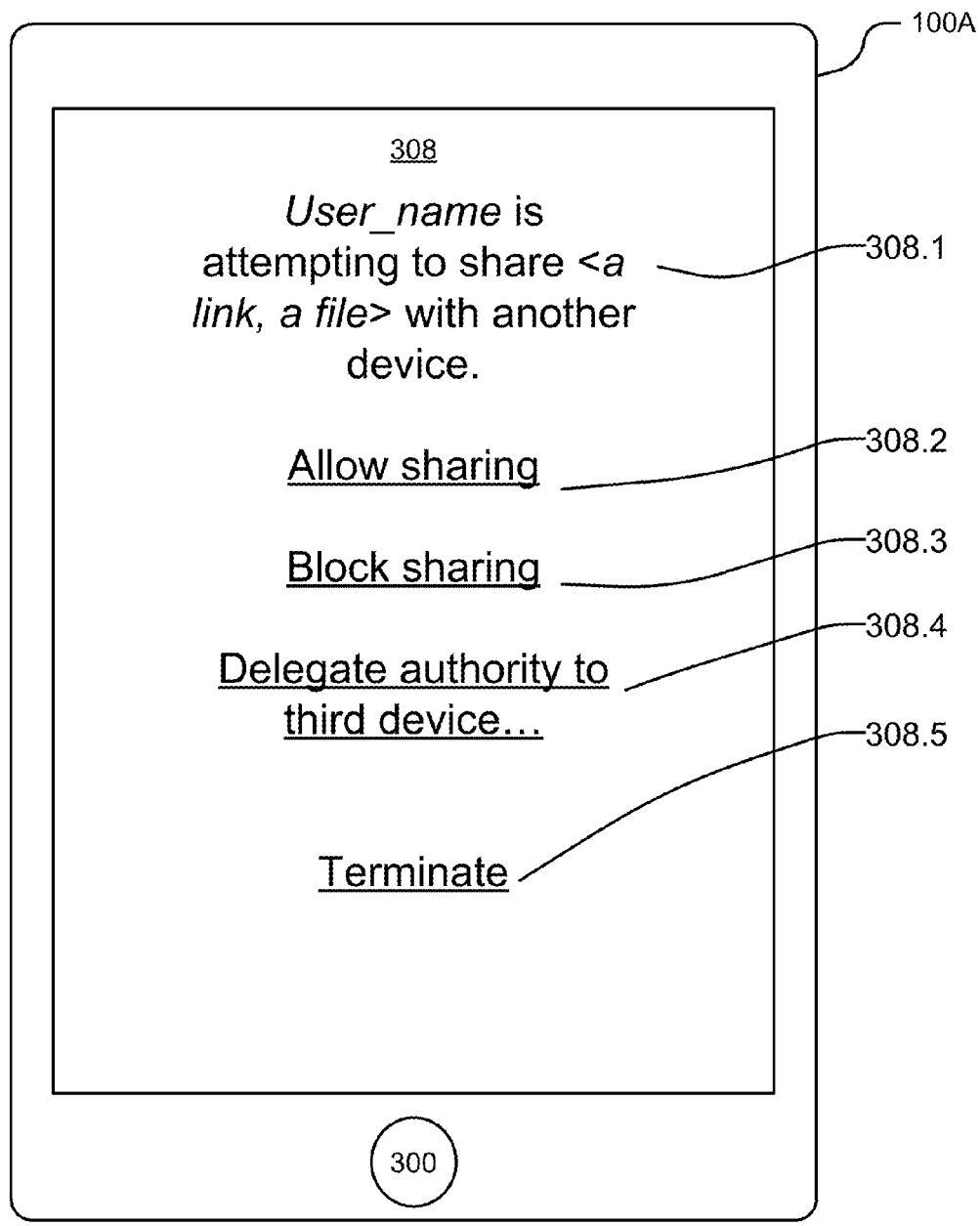
FIG. 3.8

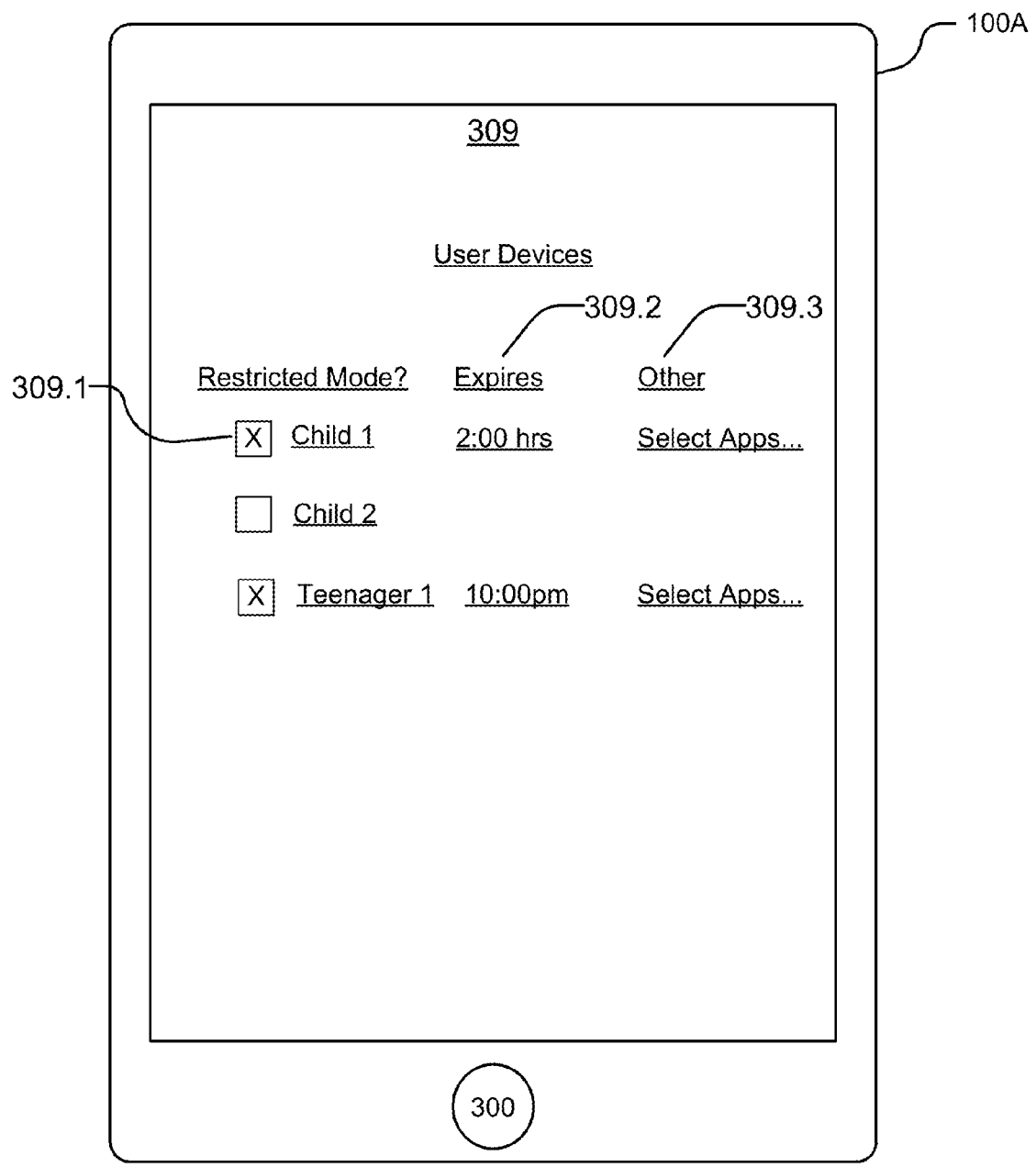
FIG. 3.9

SETTING AND TERMINATING RESTRICTED MODE OPERATION ON ELECTRONIC DEVICES

CROSS-REFERENCE TO RELATED APPLICATION

This application claims the benefit of U.S. Provisional Application No. 62/113,263 filed on Feb. 6, 2015, which is incorporated by reference in its entirety.

BACKGROUND

1. Field of Technology

The embodiments herein generally relate to the operation electronic devices in restricted and unrestricted modes, and in particular to management of restricted mode by remotely located authorization devices.

2. Background

Families of users often have one or more children or teenager who have their own computing devices, or who have access to the computing device of a parent. For example, a young child may have his tablet computer while a teenager may have both a smartphone and notebook computer. A parent may likewise have a smartphone and one or more tablets, notebooks or other computer devices. In other cases, a parent may allow a child to use his or her computer device for a limited period.

When child is using either her own computing device or the computing device of a parent, the child may attempt to use applications, access data files, use online services, alter device settings, or share content in a manner not approved by the parent. For example the parent may intend for the child to use the device just for watching a specific movie, or just to listen to music for one hour, or just to use homework related productivity applications, such as a word processor to complete a school exercise.

Some existing devices require that the parent directly and manually place the device used by the child in a restricted mode of operation, for example by directly entering a password into the device and selecting one or more specific applications or files that the child may use during the restricted mode. In particular, to exit the restricted mode of operation, the parent is required to again manually enter a password into the device and turn off the restricted mode of operation.

SUMMARY

In various embodiments, a first electronic device is operated in a restricted mode of operation, which restricted mode may be terminated or continued by one or more remotely located authorization devices, according to predetermined criteria. In one embodiment, a first electronic device, having one or more processors and a memory operates in a restricted mode, during which a first set of permitted applications stored on the first electronic device are executable, and a first set of data is accessible. While the first device is operating in the restricted mode of operation, the first device detects a termination condition of the restricted mode. In response to detecting the termination condition, the first electronic device transmits an indication of the termination condition to one or more authorization devices that are configured to authorize continuation of the restricted mode of operation on the first electronic device. After transmitting the request to continue the restricted mode of operation, the first electronic device receives from at least one of the authorization devices an indication that the restricted mode of operation has been continued according to predetermined criteria. Responsive to receiving the indication, the first electronic device continues to operate in the restricted mode according to the predetermined criteria.

In one embodiment, a non-transitory computer readable storage medium stores one or more programs, the one or more programs comprising instructions, which when executed by a first electronic device having one or more processors, a memory and a display, cause the first electronic device to perform the steps of operating the first electronic device in a restricted mode, during which a first set of permitted applications stored on the first electronic device are executable, and a first set of data is accessible; while the first device is operating in the restricted mode of operation: detecting a termination condition of the restricted mode; in response to detecting the termination condition, transmitting an indication of the termination condition to one or more authorization devices that are configured to authorize continuation of the restricted mode of operation on the first electronic device; after transmitting the request to continue the restricted mode of operation, receiving from at least one of the authorization devices an indication that the restricted mode of operation has been continued according to predetermined criteria; and responsive to receiving the indication, continue operating the first electronic device in the restricted mode according to the predetermined criteria.

In one embodiment, a device comprises a memory; one or more processors; and one or more programs stored in the memory for execution by the one or more processors, the one or more programs including instructions to perform the steps of: operating the first electronic device in a restricted mode, during which a first set of permitted applications stored on the first electronic device are executable, and a first set of data is accessible; while the first device is operating in the restricted mode of operation: detecting a termination condition of the restricted mode; in response to detecting the termination condition, transmitting an indication of the termination condition to one or more authorization devices that are configured to authorize continuation of the restricted mode of operation on the first electronic device; after transmitting the request to continue the restricted mode of operation, receiving from at least one of the authorization devices an indication that the restricted mode of operation has been continued according to predetermined criteria; and responsive to receiving the indication, continue operating the first electronic device in the restricted mode according to the predetermined criteria.

Note that the various embodiments of the family sharing account described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF DRAWINGS

FIGS. 3.1 to 3.9 are illustrations of exemplary user interface screens displayed on a computing device in conjunction with FIG. 2.

The figures depict, and the detail description describes, various non-limiting embodiments for purposes of illustration only. One skilled in the art will readily recognize from the following discussion that alternative embodiments of the structures and methods illustrated herein may be employed without departing from the principles described herein.

DETAILED DESCRIPTION

Exemplary Devices

In the discussion that follows, an electronic computing device that includes a display and a touch-sensitive surface is described. It should be understood, however, that the electronic computing device may include one or more other physical user-interface devices, such as a physical keyboard, a mouse and/or a joystick. The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Figure 1A:
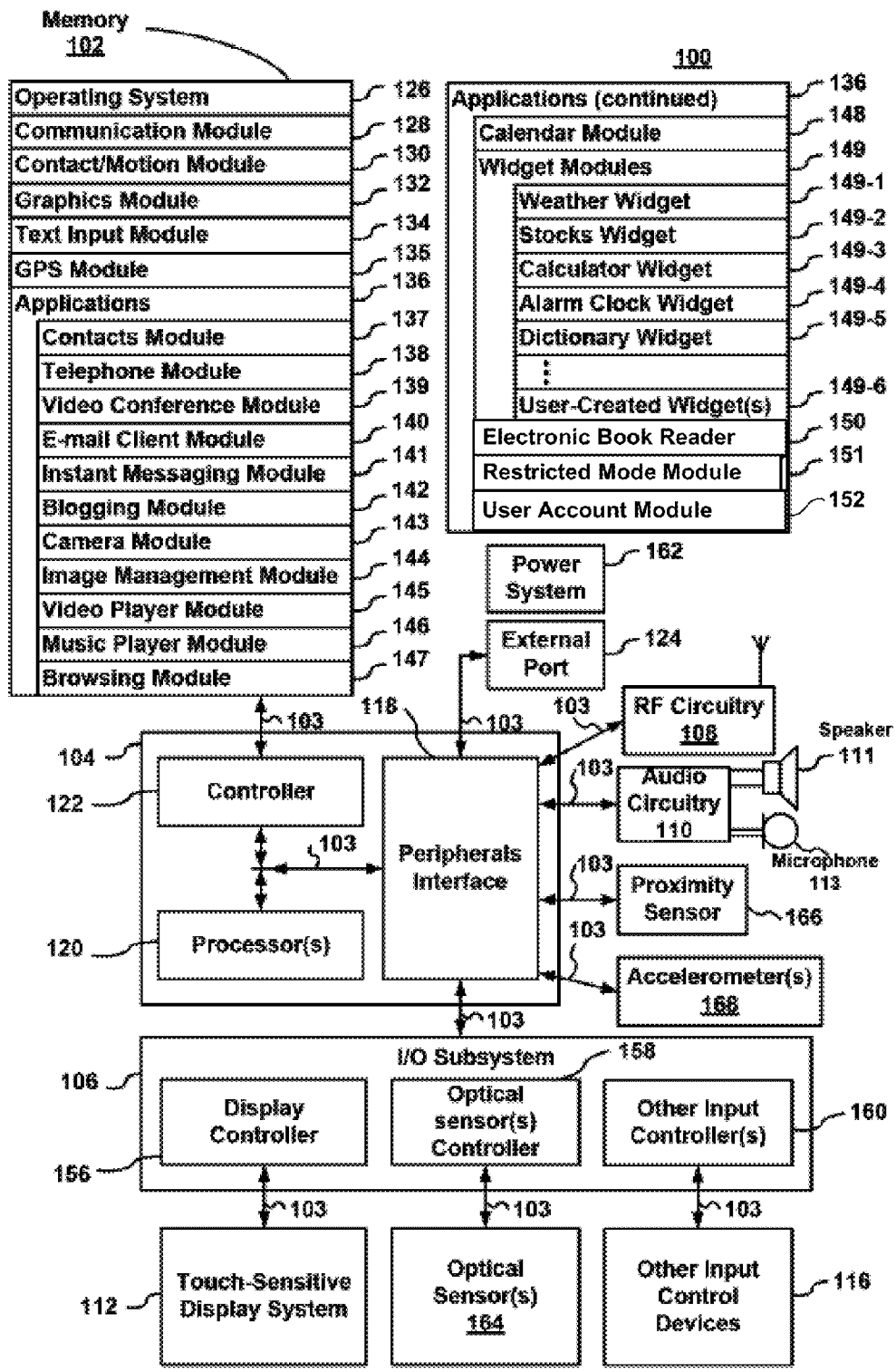
FIG. 1A is a high-level block diagram of an exemplary computing device.

FIG. 1A is a diagram of a computing device 100. The computing device 100 includes a memory 102 (which may include one or more computer readable storage mediums), a memory controller 122, and one or more processing units (CPU's) 120, a peripherals interface 118. The device 100 may further include RF circuitry 108, audio circuitry 110, a speaker 111, a microphone 113, an input/output (I/O) subsystem 106, other input or control devices 116, and an external port 124. The computing device 100 may include one or more optical sensors 164. These components communicate over one or more communication buses or signal lines 103. The device 100 includes display, which can be a touch-sensitive display system 112 according to one embodiment. The touch-sensitive display system 112 is referred to herein as a "touch screen" for convenience, and may also be known as or called a touch-sensitive display system.

The computing device 100 shown in FIG. 1A is only one example of a portable multifunction device, and the computing device 100 may have more or fewer components than shown, may combine two or more components, or a may have a different configuration or arrangement of the components. The various components shown in FIG. 1A may be implemented in hardware, software or a combination of both hardware and software, including one or more signal processing and/or application specific integrated circuits.

Memory 102 may include high-speed random access memory and may also include non-volatile memory, such as one or more magnetic disk storage devices, flash memory devices or other non-volatile solid-state memory devices. Access to memory 102 by other components of the device 100, such as the CPU 120 and the peripherals interface 118, may be controlled by the memory controller 122.

The peripherals interface 118 couples the input and output peripherals of the device to the CPU 120 and memory 102. The one or more processors 120 run or execute various software programs and/or sets of instructions stored in memory 102 to perform various functions for the device 100 and to process data.

In some embodiments, the peripherals interface 118, the CPU 120, and the memory controller 122 may be implemented on a single chip, such as a chip 104. In some other embodiments, they may be implemented on separate chips.

The RF (radio frequency) circuitry 108 receives and sends RF signals, also called electromagnetic signals. The RF circuitry 108 converts electrical signals to/from electromagnetic signals and communicates with communications networks and other communications devices via the electromagnetic signals. The RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. The RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), and/or Instant Messaging and Presence Service (IMPS)), and/or Short Message Service (SMS)), or any other suitable communication protocol, including communication protocols not yet developed as of the filing date of this document.

The audio circuitry 110, the speaker 111, and the microphone 113 provide an audio interface between a user and the device 100. The audio circuitry 110 receives audio data from the peripherals interface 118, converts the audio data to an electrical signal, and transmits the electrical signal to the speaker 111. The speaker 111 converts the electrical signal to human-audible sound waves. The audio circuitry 110 also receives electrical signals converted by the microphone 113 from sound waves. The audio circuitry 110 converts the electrical signal to audio data and transmits the audio data to the peripherals interface 118 for processing. Audio data may be retrieved from and/or transmitted to memory 102 and/or the RF circuitry 108 by the peripherals interface 118. In some embodiments, the audio circuitry 110 also includes a headset jack (e.g. 212, FIG. 2). The headset jack provides an interface between the audio circuitry 110 and removable audio input/output peripherals, such as output-only headphones or a headset with both output (e.g., a headphone for one or both ears) and input (e.g., a microphone).

The I/O subsystem 106 couples input/output peripherals on the device 100, such as the touch screen 112 and other input/control devices 116, to the peripherals interface 118. The I/O subsystem 106 may include a display controller 156 and one or more input controllers 160 for other input or control devices. The one or more input controllers 160 receive/send electrical signals from/to other input or control devices 116. The other input/control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons may include an up/down button for volume control of the speaker 111 and/or the microphone 113. The one or more buttons may include a push button. A quick press of the push button may disengage a lock of the touch screen 112 or begin a process that uses gestures on the touch screen to unlock the device, as described in U.S. Pat. No. 7,657,849, which is hereby incorporated by reference. A longer press of the push button may turn power to the device 100 on or off. The user may be able to customize a functionality of one or more of the buttons. The touch screen 112 is used to implement virtual or soft buttons and one or more soft keyboards.

The touch-sensitive touch screen 112 provides an input interface and an output interface between the device and a user. The display controller 156 receives and/or sends electrical signals from/to the touch screen 112. The touch screen 112 displays visual output to the user. The visual output may include graphics, text, icons, video, and any combination thereof (collectively termed "graphics"). In some embodiments, some or all of the visual output may correspond to user-interface objects, further details of which are described below.

A touch screen 112 has a touch-sensitive surface, sensor or set of sensors that accepts input from the user based on haptic and/or tactile contact. The touch screen 112 and the display controller 156 (along with any associated modules and/or sets of instructions in memory 102) detect contact (and any movement or breaking of the contact) on the touch screen 112 and converts the detected contact into interaction with user-interface objects (e.g., one or more soft keys, icons, web pages or images) that are displayed on the touch screen. In an exemplary embodiment, a point of contact between a touch screen 112 and the user corresponds to a finger of the user.

The touch screen 112 may use LCD (liquid crystal display) technology, or LPD (light emitting polymer display) technology although other display technologies may be used in other embodiments. The touch screen 112 and the display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 112.

The display controller 156 determine movement of contact based on speed, velocity, pressure, and/or an acceleration of the contact point, and tracks the movement across the touch screen 112. The display controller 156 determines if the contact has stopped such as the detection of a finger-up event or a break in contact with the touch screen 112. These operations may be applied to a single contact (e.g., one finger touch) or to multiple simultaneous contacts.

The display controller 156 detects a gesture input by a user on the computing device 100. Different gestures have different touch patterns. A touch pattern is characterized by one or more contact points and their associated movements, from which the spatial or geometrical relationships between the contact points can be determined. The display controller 156 detects a gesture based on a particular touch pattern on the display screen. For example, the display controller 156 detects a finger tap gesture by detecting a finger-down event indicating an initial contact of a position on the touch screen 112 followed by detecting a finger-up event at substantially the same position where the finger is no longer touching the touch screen. In another example, the display controller 156 detects a finger swipe gesture on the touch screen based on detecting a finger-down event (appearance of a contact point) followed by detecting one or more finger-dragging events where the user drags his or her finger from the position associated with the finger-down event to another position on the touch screen 112 (movement of a contact point), and subsequently followed by a finger-up event (disappearance of the contact point).

A touch-sensitive display in some embodiments of the touch screen 112 may be analogous to the multi-touch sensitive tablets described in U.S. Pat. No. 6,323,846, U.S. Pat. No. 6,570,557, and US20020015024, each of which is hereby incorporated by reference herein, in its entirety. However, a touch screen 112 displays visual output from the portable device 100, whereas touch sensitive tablets do not provide visual output.

A touch-sensitive display in some embodiments of the touch screen 112 may be as described in U.S. Pat. No. 8,279,180, U.S. Pat. No. 7,663,607, 20060026521 U.S. Pat. No. 8,239,784, U.S. Pat. No. 7,614,008, U.S. Pat. No. 7,844,914, US20060033724, and US20060197753, each of which are incorporated by reference in its entirety, herein.

The user may make contact with the touch screen 112 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen 112, the computing device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from the touch screen 112 or an extension of the touch-sensitive surface formed by the touch screen.

In some embodiments, the computing device 100 may include a physical or virtual click wheel as an input control device 116. A user may navigate among and interact with one or more graphical objects (henceforth referred to as icons) displayed in the touch screen 112 by rotating the click wheel or by moving a point of contact with the click wheel (e.g., where the amount of movement of the point of contact is measured by its angular displacement with respect to a center point of the click wheel). The click wheel may also be used to select one or more of the displayed icons. For example, the user may press down on at least a portion of the click wheel or an associated button. User commands and navigation commands provided by the user via the click wheel may be processed by an input controller 160 as well as one or more of the modules and/or sets of instructions in memory 102. For a virtual click wheel, the click wheel and click wheel controller may be part of the touch screen 112 and the display controller 156, respectively. For a virtual click wheel, the click wheel may be either an opaque or semitransparent object that appears and disappears on the touch screen display in response to user interaction with the device. In some embodiments, a virtual click wheel is displayed on the touch screen of a portable multifunction device and operated by user contact with the touch screen.

The computing device 100 also includes a power system 162 for powering the various components. The power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The computing device 100 may also include one or more optical sensors 164. FIG. 1A shows an optical sensor coupled to an optical sensor controller 158 in I/O subsystem 106. The optical sensor 164 may include charge-coupled device (CCD) or complementary metal-oxide semiconductor (CMOS) phototransistors. The optical sensor 164 receives light from the environment, projected through one or more lens, and converts the light to data representing an image. In conjunction with an imaging module 143 (also called a camera module), the optical sensor 164 may capture still images or video. In some embodiments, an optical sensor is located on the back of the computing device 100, opposite the touch screen 112 on the front of the device, so that the touch screen display may be used as a viewfinder for either still and/or video image acquisition. In some embodiments, an optical sensor is located on the front of the device so that the user's image may be obtained for videoconferencing while the user views the other video conference participants on the touch screen display. In some embodiments, the position of the optical sensor 164 can be changed by the user (e.g., by rotating the lens and the sensor in the device housing) so that a single optical sensor 164 may be used along with the touch screen display for both video conferencing and still and/or video image acquisition.

The computing device 100 may also include one or more proximity sensors 166. FIG. 1A shows a proximity sensor 166 coupled to the peripherals interface 118. Alternately, the proximity sensor 166 may be coupled to an input controller 160 in the I/O subsystem 106. The proximity sensor 166 may perform as described in U.S. Pat. No. 7,653,883, U.S. Pat. No. 8,381,135, U.S. Pat. No. 7,957,762, U.S. Pat. No. 7,633,076, and U.S. Pat. No. 8,006,002, each of which are incorporated by reference herein, in its entirety. In some embodiments, the proximity sensor turns off and disables the touch screen 112 when the multifunction device is placed near the user's ear (e.g., when the user is making a phone call). In some embodiments, the proximity sensor keeps the screen off when the device is in the user's pocket, purse, or other dark area to prevent unnecessary battery drainage when the device is a locked state.

The computing device 100 may also include one or more accelerometers 168. FIG. 1A shows an accelerometer 168 coupled to the peripherals interface 118. Alternately, the accelerometer 168 may be coupled to an input controller 160 in the I/O subsystem 106. The accelerometer 168 may perform as described in U.S. Pat. No. 7,218,226 and U.S. Pat. No. 7,688,306, each of which are incorporated by reference herein, in its entirety. In some embodiments, information is displayed on the touch screen display in a portrait view or a landscape view based on an analysis of data received from the one or more accelerometers.

In some embodiments, the software components stored in memory 102 may include an operating system 126, a communication module (or set of instructions) 128, a contact/motion module (or set of instructions) 130, a graphics module (or set of instructions) 132, a text input module (or set of instructions) 134, a Global Positioning System (GPS) module (or set of instructions) 135, and applications (or set of instructions) 136.

The operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 128 facilitates communication with other devices over one or more external ports 124 and also includes various software components for handling data received by the RF circuitry 108 and/or the external port 124. The external port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Computer, Inc.) devices.

The contact/motion module 130 may detect contact with the touch screen 112 (in conjunction with the display controller 156) and other touch sensitive devices (e.g., a touchpad or physical click wheel). The contact/motion module 130 includes various software components for performing various operations related to detection of contact, such as determining if contact has occurred, determining if there is movement of the contact and tracking the movement across the touch screen 112, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, the contact/motion module 130 and the display controller 156 also detects contact on a touchpad. In some embodiments, the contact/motion module 130 and the controller 160 detects contact on a click wheel.

The graphics module 132 includes various known software components for rendering and displaying graphics on the touch screen 112, including components for changing the intensity of graphics that are displayed. As used herein, the term "graphics" includes any object that can be displayed to a user, including without limitation text, web pages, icons (such as user-interface objects including soft keys), digital images, videos, animations and the like.

The text input module 134, which may be a component of graphics module 132, provides soft keyboards for entering text in various applications (e.g., contacts 137, e-mail 140, IM 141, blogging 142, browser 147, and any other application that needs text input).

The GPS module 135 determines the location of the device and provides this information for use in various applications (e.g., to telephone 138 for use in location-based dialing, to camera 143 and/or blogger 142 as picture/video metadata, and to applications that provide location-based services such as weather widgets, local yellow page widgets, and map/navigation widgets).

The applications 136 may include the following modules (or sets of instructions), or a subset or superset thereof:
- a contacts module 137 (sometimes called an address book or contact list);
- a telephone module 138;
- a video conferencing module 139;
- an e-mail client module 140;
- an instant messaging (IM) module 141;
- a blogging module 142;
- a camera module 143 for still and/or video images;
- an image management module 144;
- a video player module 145;
- a music player module 146;
- a browser module 147;
- a calendar module 148;
- widget modules 149, which may include weather widget 149-1, stocks widget 149-2, calculator widget 149-3, alarm clock widget 149-4, dictionary widget 149-5, and other widgets obtained by the user, as well as user-created widgets 149-6;
- electronic book reader module 150
- restricted mode module 151;
- user account module 152.

Examples of other applications 136 that may be stored in memory 102 include a video chat application, a messaging application, other word processing applications, JAVA-enabled applications, encryption, digital rights management, voice recognition, and voice replication.

Each of the above identified modules and applications correspond to a set of instructions for performing one or more functions described above. These modules (i.e., sets of instructions) need not be implemented as separate software programs, procedures or modules, and thus various subsets of these modules may be combined or otherwise re-arranged in various embodiments. For example, video player module 145 may be combined with music player module 146 into a single module. In some embodiments, memory 102 may store a subset of the modules and data structures identified above. Furthermore, memory 102 may store additional modules and data structures not described above.

In some embodiments, the computing device 100 is a device where operation of a predefined set of functions on the device is performed exclusively through a touch screen 112 and/or a touchpad. By using a touch screen and/or a touchpad as the primary input/control device for operation of the computing device 100, the number of physical input/control devices (such as push buttons, dials, and the like) on the device 100 may be reduced.

The predefined set of functions that may be performed exclusively through a touch screen and/or a touchpad include navigation between user interfaces. In some embodiments, the touchpad, when touched by the user, navigates the computing device 100 to a main, home, or root menu from any user interface that may be displayed on the device 100. In such embodiments, the touchpad may be referred to as a "menu button." In some other embodiments, the menu button may be a physical push button or other physical input/control device instead of a touchpad.

Figure 1B:
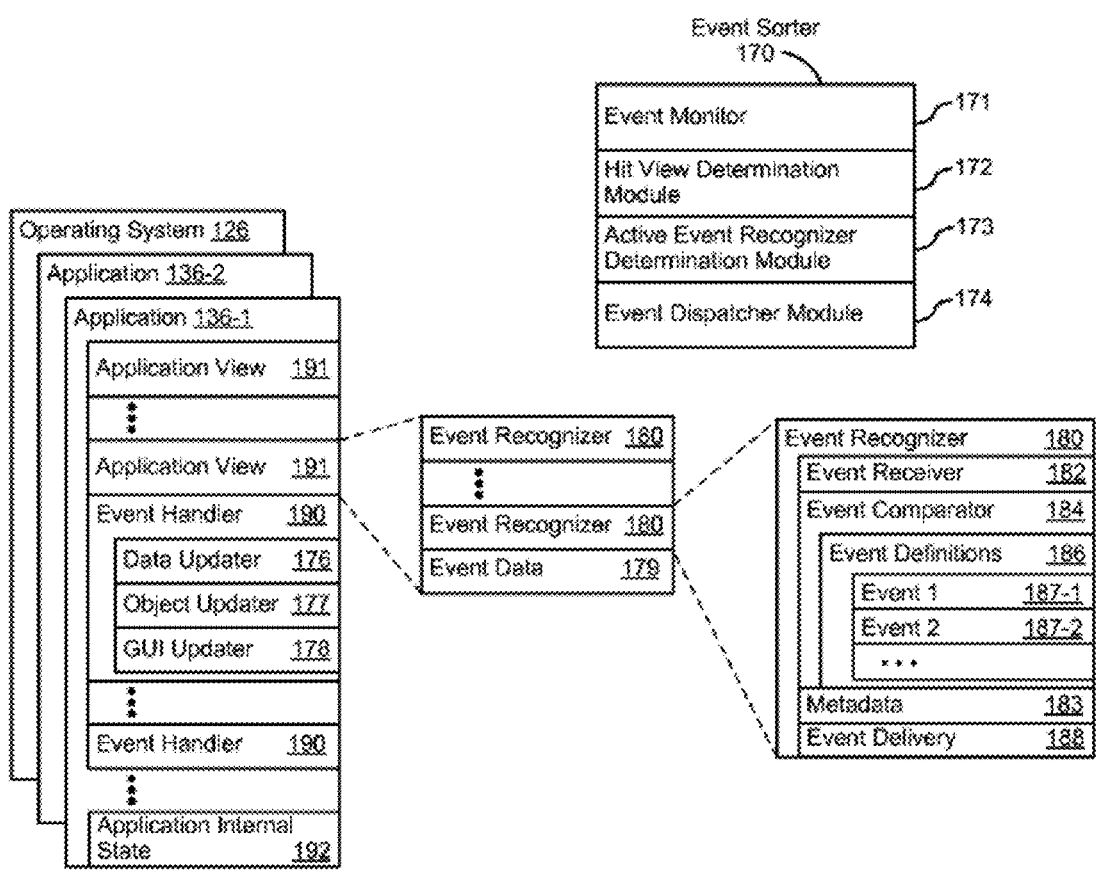
FIG. 1B is a block diagram of exemplary components for event handling.

FIG. 1B is a block diagram illustrating exemplary components for event handling in accordance with one embodiment. In one embodiment, memory 102 (in FIG. 1A) includes event sorter 170 (e.g., in operating system 126), operating system 126, one or more applications (e.g., 136-1 and 136-2, which can be any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application.

For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to one or more event recognizers (e.g., event recognizer 180). In some embodiments, event dispatcher module 174 dispatches the event information to one or more event recognizers in a single application. In other embodiments, event dispatcher module 174 dispatches the event information to event recognizers in a plurality of applications 136, or the operating system 126 and at least one application. In embodiments including active event recognizer determination module 173, event dispatcher module 174 delivers the event information to one or more event recognizers including an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, respective applications (e.g., 136-1 and 136-2) include a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In some embodiments, the operating system 126 includes one or more event recognizers 180. In some embodiments, the event sorter 170 includes one or more event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancelation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Management of Restricted Mode of Operation

Figure 1C:
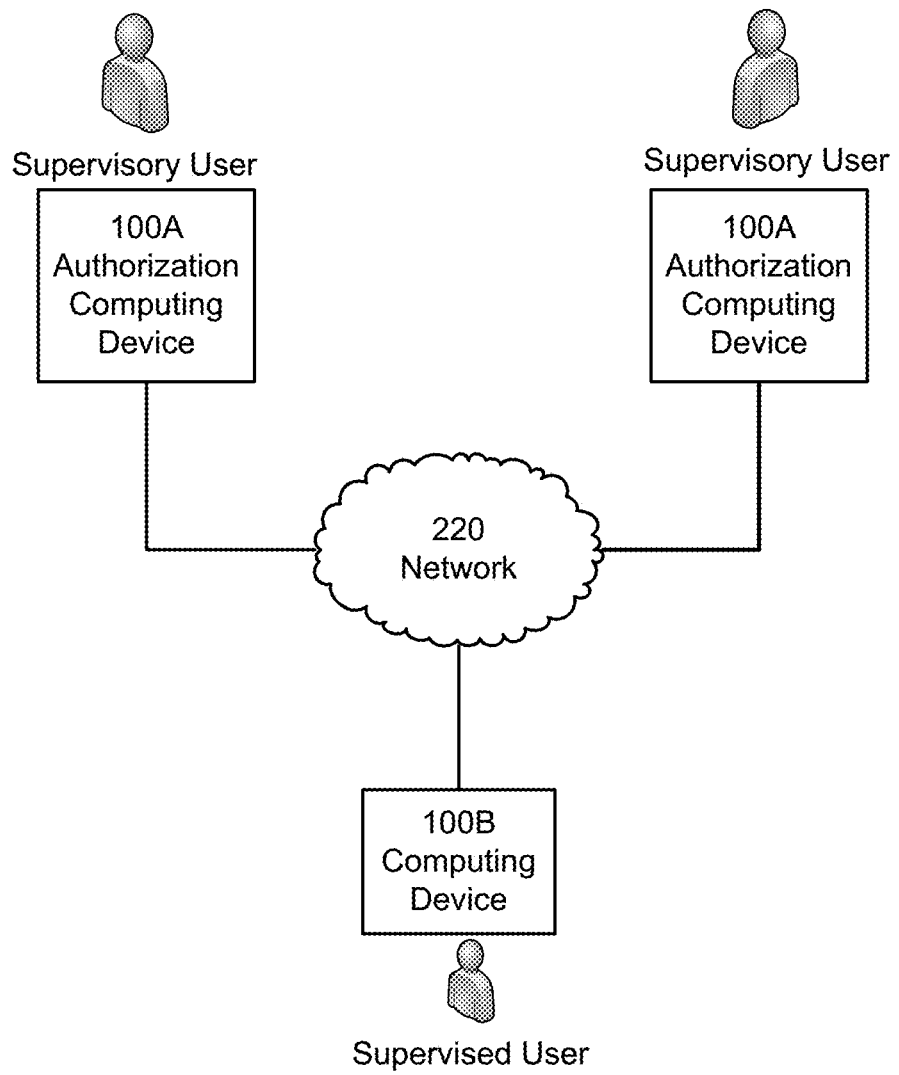
FIG. 1C is a high level block diagram of an exemplary environment including authorization devices and a restricted computing device.

Referring to FIG. 1C, there is shown computing devices 100A, 100B coupled to a network 220. In the general case, the devices 100 are located remotely from each other, though they may be collocated at certain times. In the context of the following description, devices 100A are assumed to be used by a supervisory user who is authorized to control and configure the devices 100, device 100B is assumed to be used by a supervised user, and device 100C is assumed to be used by another supervisory user. Examples of supervisory users include adult family members, teachers, managers, physicians and medical professionals; examples of supervised users include child and teenage family members, students, workers, and patients. Device 100B may be referred to herein as a "restricted device" that is configured to operate in at least two different modes, an unrestricted mode and a restricted mode; devices 100A may be referred to herein as "authorization devices" as they are configured to manage and authorize the particular mode of operation on the device 100B used by the child family member. Various embodiments of a device 100 that is configurable to operate in a restricted mode in this manner is disclosed in U.S. Pat. No. 8,812,994, which is incorporated by reference herein in its entirety.

Figure 2:
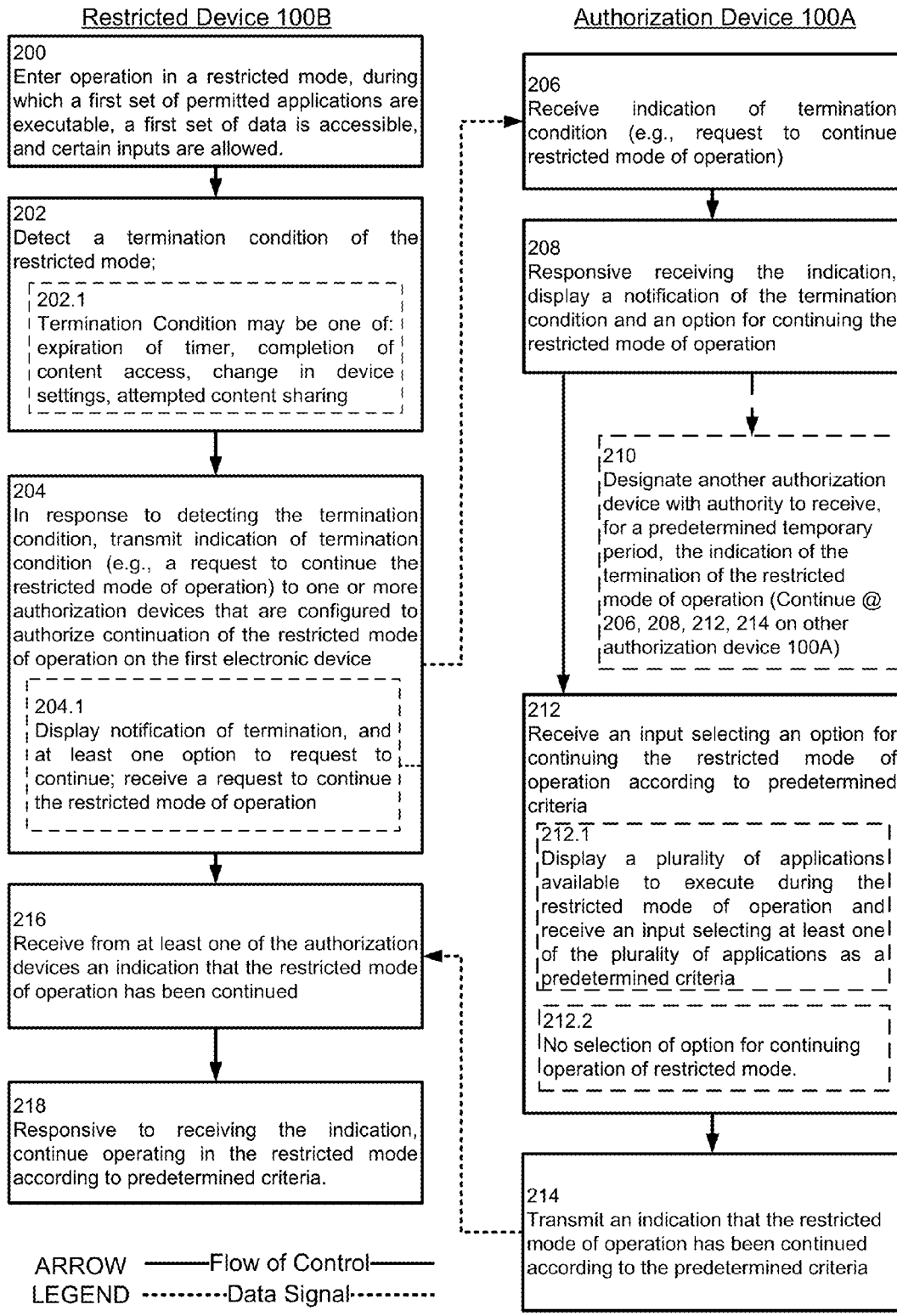
FIG. 2 is a flow diagram illustrating an overall execution flow for managing a restricted device using an authorization device according to one embodiment.

Referring generally to FIG. 2 there is shown an overall execution flow for managing a restricted device 100B using an authorization device 100A according to one embodiment, as may be controlled by specially programmed code (computer programming instructions) contained in the restricted mode module 151, wherein such specially programmed code is not natively present in the device 100A in the absence of the restrict mode module 151. Other embodiments may perform the operations in the execution flow in other sequences. Examples of various user interfaces that can be displayed by the devices 100 in conjunction with the steps of the method flow are illustrated in FIGS. 3.1 to 3.9. These user interfaces are referred herein as "screens," which is understood to include windows, banners, pages, dialogs, messages and other graphical presentations of information.

In addition, throughout reference is made to actions and operations initiated in response to various user interface elements including links and controls; other types of user interface elements such as buttons, check boxes, menus, dials, and the like may be used in place of the described links and controls to achieve the described functionality. Further, transmissions of information between the computing devices 100 and the content storage system 200 (or component thereof) may be characterized equivalently as messages, indications, notifications, packets, or other carriers of data between computing systems, whether or not explicitly described as such below. It is understood that such transmissions occur via the network 220 using communications protocols such as previously identified. It is further understood that the described processes require the use of computer systems and cannot be performed in whole or in part by mental steps by a human being.

Referring to FIG. 2 then, the following steps are performed by the restricted device 100B and one or more the authorization devices 100A, wherein each of the devices 100 includes one or more processors and memory.

200: The restricted device 100B enters operation in a restricted mode, during which a first set of permitted applications stored on the restricted device 100B are executable, and a first set of permitted data is accessible, and certain types of physical inputs are allowed. FIG. 3.1 illustrates an example screen 301 on device 100B showing the device operating in restricted mode. In this example, the device 100B is configured to execute as a permitted application an educational application 301.3 in a specified area 301.5 of the touch screen. A user input 301.2 inside area 301.5 is accepted, while user inputs 301.1 outside of area 301.5 are ignored.

Generally, when operating in unrestricted mode, the device 100B has access to installed applications, data, networking connectivity, online applications, and other user-facing device features and hardware, and responds to all types of user inputs, such as touches, movements, shaking, and rotation. When operating in restricted mode (also called a restricted session), the device 100B has limited access to a subset of applications and/or data but cannot access applications, data, hardware, or connectivity that are designated as restricted, and responds only to certain types of inputs, according to predetermined criteria. In one embodiment, the various criteria are stored in the user account module 152 and accessed by the restricted mode module 151.

In one embodiment, the operation of the device 100B in restricted mode occurs automatically based upon an assigned role of the user of the device, for example, the user who is currently logged into the device via their user name and password (or other authentication information). For example, where the device 100B is used by a user having the role of "child," the device 100B is configured to automatically operate in restricted mode upon activation, until instructed by one of the authorization devices 100A, 100C to operate in unrestricted mode. In one embodiment, the assigned role of a user is stored in the user account module 152. When the device 100B is activated (e.g., turned on) the operating system 126 determines the role information stored in the user account module 152, and determines based on the role of the user whether to operate the device 100B in restricted mode (e.g., if the role of the user is a supervised role, such as "child") or in unrestricted mode (e.g., if the role of the user is supervisory role, such as "parent" or "adult" or "teacher"). The determination whether to operate in restricted mode or unrestricted mode may also be made by the operating system 126 based on the current age of the user; if the user is below a predetermined age (e.g., less than 13 years), the operating system 126 may set the device 100B to operate in restricted mode, otherwise the device 100B is set to operate in unrestricted mode.

In one embodiment of a restricted mode, the device is restricted by the predetermined criteria to execute a specifically defined first set of permitted applications ("permitted applications"), and prevented from executing a second set of restricted applications ("restricted applications"). The set of permitted applications accessible in the restricted mode according to the predetermined criteria may be (1) pre-defined and static; or (2) pre-defined and user-customizable criteria that can customized by a supervisory user; (3) entirely user-specified by at least one of the supervisory users; (4) determined at run-time (e.g., dynamically) by a request from the supervised user to the supervisory user at the time a particular application is accessed by the user. For example, a game may be available on the restricted device 100B, and the supervised user (e.g., a child) may attempt to open it, in which event the device 100B transmits a request to the device 100A of the supervisory user (e.g. a parent or teacher) who can decide whether to grant access to the game at that time. The set of restricted and permitted applications may be stored in the user account module 152.

For example, the restricted device 100B may be configured by the predetermined criteria to include in the permitted applications only a word processing application, a spreadsheet application, and one or more of the widget modules 149. The restricted applications during the restricted mode would various ones of the applications 136 such as the telephone module 138 (thereby preventing the user from making or receiving telephone calls), the camera module 143 (thereby preventing the user from taking photographs), and the video and music player modules 145, 146 thereby preventing the user from watching or listening to movie or music, and any gaming applications. This type of configuration is beneficial to ensure that a child user will use the restricted device 100B for productive purposes (e.g., completing homework assignments) with the distraction of the other applications. Alternatively, the permitted applications can be limited to include one or more games, and make the restricted applications all other applications. This is beneficial for allowing a young child to use the restricted device 100B for entertainment while ensuring the child cannot accidentally access or use any of the other applications.

In one embodiment of a restricted mode, the device is restricted by the predetermined criteria to accessing a specifically defined first set of permitted data ("permitted data"), and prevented from accessing (e.g., reading, viewing, editing, displaying) other second data ("restricted data"). The set of permitted data accessible in the restricted mode according to the predetermined criteria may be (1) pre-defined and static; or (2) pre-defined but user-customizable; (3) entirely user-specified by one of the authorizing or supervisory users.

The predetermined criteria for defining permitted or restricted applications or data may include at least one of (1) file name or keywords for application or data file; (2) file type or extension (e.g., movies) for a data file; (3) content rating or age restrictions for a data file (e.g. a restriction on "R" rated movies, games designated for ages 14 and over); (4) time of day at which an application or data is permitted or restricted; (5) length of time of use or access to a permitted application or permitted data; (6) number of accesses to a permitted application or data file (e.g., number of times a movie is viewed); (7) completion of specified conditions (e.g., completion of use of specific applications or data) prior to access to a permitted application or permitted data; (8) application type (e.g. a restriction on messaging application, or content players) for a permitted or restricted application; (9) website URL or domain, or website type or category; (10) entering a collaboration state between the restricted device 100B and a second, different device 100, such as sharing a document, or concurrent access to an application (e.g., two devices 100B accessing and editing a common document, such as a school assignment).

In one embodiment, the predetermined criteria are specific to a particular user account, rather to a particular restricted device 100B. This results in the criteria being applied to any device 100 that the particular user is logged into. Thus, if the user has multiple devices 100 available, the restricted mode of operation is applied to all of the devices 100 of the user. In this embodiment, the predetermined criteria are stored in a user account file located on a network based server. When a user activates a device 100 and logs into the device with a user name and password, the device 100 communicates with the network based server to request the predetermined criteria stored in the user account file; the requested predetermined criteria is received by the restricted device 100B from the networked based server. The device 100 then applies the criteria to determine whether to operate in restricted mode or unrestricted mode. In one embodiment, a user of the authorization device 100A, such as a supervisory user, configures the various predetermined criteria applicable to each restricted device 100B, which information is then stored in the network based server.

In one embodiment, the device 100B is configured to enter into the restricted mode automatically upon activation or startup without explicitly notifying (e.g., via a user interface notification) the user of the restricted device 100B which other devices 100A, 100C or users are supervisory to place the device 100B in an unrestricted mode. Alternatively, the device 100B may be configured to notify (e.g., via a user interface notification) the user that the device operating in restricted mode, and/or notify the user of which other devices 100A, 100C or users are supervisory to place the device 100B in an unrestricted mode.

In some embodiments, in restricted mode the device 100B is configured to accept only a first subset of types of physical inputs and to ignore a second, different subset of other types of user inputs. The types of inputs that may be accepted in the first subset or ignored in the second subset include one or more of the following: touch inputs on the touch-sensitive surface, rotation of the electronic device, shaking of the electronic device, or a movement of the electronic device. For example, while operating in restricted mode, the device 100B may accept touch inputs only in a specified area of the touch screen 112 and may ignore any shaking, rotation, or movement inputs. In unrestricted mode, the device 100B is configured to respond to all such inputs. Operating in restricted mode to ignore these various selected inputs is beneficial to prevent the user from accidentally activating a particular function associated with such inputs.

In summary then, the unrestricted mode and restricted mode provide different levels of access to applications and/or data stored on the device 100B, as well as different responses to various types of user inputs. In some embodiments, the unrestricted mode of the device provides unfettered access to all of the device's data and/or applications that are available to a user, and responds to all types of inputs, while its restricted mode provides access to a limited set of applications and/or data according to predetermined criteria, and responds to a limit class of inputs. In other words, when the device is operated in its restricted mode, the user has access to a subset of applications and/or data but cannot access data and/or applications that are restricted during the restricted mode. In addition to restricting access to certain applications in the restricted mode, the device also restricts access to data stored by such restricted applications to applications (including the operating system of the device in some embodiments) that are not restricted in the restricted mode.

202: While the first device 100 is operating in the restricted mode of operation, the device 100 detects a termination condition of the restricted mode. The detected termination condition may be one (or more) of an expiration of a timer on the device 100, a completion of a content access on the device, a change in device settings (wherein a change includes an attempted change) of the device 100, a content sharing (wherein a sharing include an attempted sharing) from the device 100 to a second, different device 100, or aggregate usage history of the device 100.

202.1: Examples of these termination conditions are as follows.

Expiration of a Timer: In one embodiment, a timer on the restricted device 100B is established by either the restricted device 100B itself or by an authorization device 100A. Various types of timers are as follows.

The timer may be established from the time that the device is activated by the user and for specified period of time; for example, the timer may be set to allow the child family member to use the restricted device 100B for a period of one hour after the device is activated.

The timer may be established from the time that the device is activated by the user until a designated time; for example, the timer may be set to allow the child family member to use the restricted device 100B until 4 pm in the afternoon, regardless of when it is turned on.

The timer may be established from the time that a particular application is activated by the user for specified period of time; for example, the timer may be set to allow the child family member use a media player to watch movies for a period of one hour.

The timer may be established from the time that a particular application is activated by the user until a designated time; for example, the timer may be set to allow the child family member use a media player to watch movies until 4 pm in the afternoon. Alternatively, the time period may have a designated start time (e.g., 2 pm) and ending time (4 pm). Alternatively, the specified period of time may be periodic; for example 10 minutes beginning every hour, between designated start time and a designated end time, or weekdays from 4 pm to 6 pm. Other option enables the supervisory user to establish an overall time budget (e.g., 20 hours per week), and the supervised user can request increments of time (controlled by the timer) to be allocated to individual applications or data files.

Completion of Content Access:

The termination condition may be the completion of an access to a content item. A completion of access may comprise completion of playback of a media file, such as a movie, video, or presentation, or other multimedia content. For example, the restricted device 100B may be configured to access a specific movie file so that the user may watch the entire movie using the video player module 145. When the video player module 145 reaches the end of the movie file, it signals the device 100B that the movie has been completed, which triggers the termination condition.

As another example, the restricted device 100B may be configured to access a playlist of music files so that the user may listen to the playlist using the music player module 146. When the music player module 146 completes playback of the playlist, it signals the device 100B that the playlist has been completed, which triggers the termination condition.

A completion of content access may include completion of a use of a specified application or completion of a data file associated with a specified application. For example, the restricted device 100B may be configured to detect the completion of a specific section or exercises in an educational application such as a mathematics, language arts, science, or social sciences application. When the application detects that the section or exercise is completed, it signals the device 100B, which triggers the termination condition. Similarly, when the restricted mode is activated based upon entering a collaboration state with another device 100, exiting the collaboration state may be a termination condition.

Change in Device Settings:

Another termination condition may include a change in the operational settings of the device 100B, wherein a change in the operation settings includes an attempted change. Changes in operational settings include 1) changes in user profile data, such as name, password, access features; 2) change in installed applications; 3) change in network, memory, storage, or other hardware features; 4) changes in commerce related settings, such as stored credit card or other payment information; 5) additions or deletions of user accounts; 6) attempted changes in any of the foregoing, where the restricted device 100B is configured to prevent such changes. Using a change in an operational setting as a termination condition is beneficial to provide the user of the authorization device 100A, such as a parent, with control over the use of the restricted device 100B by the child.

Sharing of Content:

Another termination condition may include sharing of content by the user of the restricted device 100B, wherein a sharing includes an attempted sharing. A sharing of content may be detected by the restricted device 100B via notifications received by the operating system 126 that particular applications (e.g., instant messaging module 141, email client module 140) are requesting access to stored content files to transmit such files via network interface or communications port, such as external port 124. The sharing of content may also be detected by identifying a hyperlink within a message, email, or other communication.

Aggregate Usage:

In one embodiment, the predetermined criteria is based on an aggregate usage history of the restricted device 100B, rather than a specific usage during a particular session. For example, the predetermined criteria for termination and notification may be an attempt by the restricted device 100B to exceed a predetermined time usage limit (e.g., 2 hour) more than predetermined number of times during the past week (e.g., more than 3 attempts). Or the predetermined criteria may be a total time of use over an extended period, such as more than 10 hours of use over a week's period.

204: In response to detecting the termination condition, the restricted device 100B transmits an indication of the termination condition to one or more authorizing devices 100A that are configured to authorize continuation of the restricted mode of operation on the restricted device 100B. In one embodiment, the indication is a request to continue the restricted mode of operation. In one embodiment, the restricted device 100B transmits 204 the indication automatically without displaying on the restricted device 100B any notification to the user of the restricted device 100B of the transmitted request; that is the restricted device 100B suppresses the indication. This is beneficial where the supervisory user does not want the supervised user using the restricted device 100B to know that the restricted mode has been terminated.

204.1: In one embodiment, in response to detecting the termination condition, the restricted device 100B further displays a screen to the user of the restricted device 100B notifying the user that the restricted mode has terminated, and providing at least one option to request a continuation of the restricted mode, or to terminate operation of the restricted device 100B. FIG. 3.2 illustrates an example screen 302 on device 100B showing a notification 302.1 of the termination condition and at least one option 302.2 to request a continuation of the restricted mode of operation. In this embodiment, the restricted device 100B is configured 204.1 to receive an input 302.3 to request continuation of the restricted mode.

206: Referring to the right-hand side of FIG. 2, authorization device 100A receives the indication of the termination condition, e.g., the request to continue the restricted mode of operation on the restricted device 100B.

In one embodiment, the indication of the termination condition is received at a plurality of authorization devices 100A, wherein the plurality of authorization devices 100A are pre-designated as having a predefined authority role that enables the user of the device to authorize the continued operation of the restricted mode. The identification of which devices are authorization devices 100A is stored in the user account server 209 in an account associated with the group comprising the authorization devices 100A and the restricted device(s) 100B.

208: Responsive to receiving the request, the authorization device 100A displays a notification of the termination condition and at least one selectable option for responding to the indication, including at least one option for continuing the restricted mode of operation.

In one embodiment, the authorization device 100A displays a screen based on the indication of the termination condition, notifying the user of the authorization device 100A of the basis of the termination. For example, the screen can indicate any of the following: that a timer has expired, that a content access has been completed, that there has been an actual or attempted change in the operation settings of the restricted device 100B, or that there has been an actual or attempted sharing of content from the restricted device 100B to another device.

FIG. 3.3 illustrates an example screen 303 on device 100A showing a notification of the termination and at least one option 303.2-303.6 for continuing the restricted mode of operation according to predetermined criteria. The predetermined criteria for the continued operation may comprise one of a timer for the continued operation a content access limitation or an event condition. The timer may be set 303.2 to provide continued operation for a specified period of time (e.g., additional 1 hour of continued operation), or until a specified time 303.3 (continued operation until 6 pm). The predetermined criteria may include a content access criterion 303.4 that may be set to provide access to a particular content file (e.g. a selected movie, music file, or playlist, document). The user of the authorization device 100A can select then terminate 303.7 option if they do not wish to extend the restricted mode of operation.

In one embodiment, in response to receiving indication of the termination condition from the restricted device 100B, the authorization device 100A suppresses the notification that includes the one or more selectable options for responding to the authorization event.

210: In one embodiment, one of the options displayed by the authorization device 100A is an option 309 to designate another authorization device 100A (herein a "delegate") with authority to receive, for a predetermined temporary period, the indication of the termination of the restricted mode of operation of the second device, and to transmit to the restricted device 100B the indication that the restricted mode of operation has been continued. Upon selection of the option 309, the authorization device 100A displays a screen 305, such as illustrated in FIG. 3.4 with one or more options 304.1, 304.2 for selecting an authorization device 100A as a delegate. The length of the temporary time period can be a predetermined and fixed value (e.g., 1 hour) or can be a variable value set by the user of the initial authorization device 100A in a provided settings interface. In this embodiment, once an option 304.1, 304.2 is selected, the method executes steps 206, 208 on the selected authorization device 100A, followed by steps 212 and 214 as next described.

212: The authorization device 100A (either the original device or the selected delegate) receives a first input that corresponds to a selection of an option 307 for continuing the restricted mode of operation on the restricted device, according to one or more predetermined criteria.

212.1: In one embodiment, the authorization device 100A may display the notification of the termination condition along with a list of a plurality of applications available to execute on the restricted device 100B during the restricted mode of operation. FIG. 3.4 illustrates an example screen showing a list of the plurality of applications 305.1-305.5 that may be individually selected for use during the continued operation of the restricted mode. After selection of application(s) in the list, the user of the authorization device 100A selects the continue link 305.6. The method continues at step 214.

212.2: In some embodiments, the authorization device 100A does not receive an input selecting an option for continuing the restricted mode (or equivalently, receives a selection of an option to terminate the restricted mode). In that case, no action is taken, and the restricted device 100B will automatically revert to the unrestricted mode of operation.

214: The authorization device 100A transmits to the restricted device 100B an indication that the restricted mode of operation has been continued, according to the one or more predetermined criteria as selected by the user of the authorization device 100A, as described above.

216: The restricted device 100B receives from at least one of the authorization devices 100A the indication that the restricted mode of operation has been continued, according to the one or more predetermined criteria.

218: Responsive to the received indication, the restricted device 100B continues to operate in the restricted mode, according to the one or more predetermined criteria.

Several examples of notification screens, as may be displayed on an authorization device 100A in response to receiving an indication of the termination of a restricted mode of operation on a restricted device 100B, are now described.

FIG. 3.6 illustrates a screen 306 providing a notification 306.1 that a specific movie with the name movie_name playing on the restricted device 100B of a user identified by user_name has ended and providing options for continuing operation of the restricted mode, including an option 306.2 to repeated playback of a previously selected movie, and an option 306.3 to select another, different movie for playback. This type of option may be one example of predetermined criteria (1) and (6) as described above. In response to a selection by a supervisory user of an option 306.2 to playback the movie again, the authorization device 100A transmits a response to the restricted device 100B including an indication that the restricted mode of operation is continued and that the movie may be played another time.

In response to a selection by a supervisory user of an option 306.3 to select another movie, the authorization device 100A transmits a response to the restricted device 100B including an indication that the restricted mode of operation is continued, and that the restricted device 100B is configured to provide a file selection menu or screen via which the user of the restricted device 100B may select another, different movie for playback. This type of option may be one example of predetermined criteria (1) as described above.

In response to a selection by a supervisory user of an option 306.4 to select an application for execution, the authorization device 100A displays a list of permitted applications installed on the restricted device 100B, and is configured to receive from the supervisory user a selection of one or more of the permitted applications. This type of option may be one example of predetermined criteria (1), (2), and (6) as described above. After receipt of such selection(s), the authorization device 100A transmits a response to the restricted device 100B including an indication that the restricted mode of operation is continued, and further including a designation of the selected application(s). If the selection from the authorization device 100A was for a single application, then the restricted device 100B executes the selected single application. If the selection from the authorization device 100A was for two or more applications, then the restricted device 100B provides a user interface screen (e.g., FIG. 3.5) via which the user of the restricted device 100B can select which of the two or more applications to execute. Responsive to receiving from the user of the restricted device 100B a selection of one of the two or more applications, the restricted device 100B executes the selected application.

In response to a selection by a supervisory user of an option 306.5 to delegate authority to a third device, the authorization device 100A displays a screen (e.g., similar to FIG. 3.4) providing a list of delegates to whom authority may be transmitted. In response to a selection of one of the delegates, the authorization device 100A transmits an indication to the device 100A of the selected delegate that they have authority to continue or terminate the restricted mode of operation.

FIG. 3.7 illustrates a screen 307 providing a notification 307.1 that the user with user_name is attempting to change an operational setting of the restricted device 100B such as changing a password on the device, and providing an option 307.2 to allow the change, and an option 307.3 to block the change.

In response to a selection by a supervisory user of an option 307.2 to allow the change, the authorization device 100A transmits a response to the restricted device 100B including an indication that the attempted change is to be allowed. Responsive to the indication, the restricted device 100B effects the change.

In response to a selection by a supervisory user of an option 307.3 to block the change, the authorization device 100A transmits a response to the restricted device 100B including an indication that the attempted change is to be blocked. Responsive to the indication, the restricted device 100B prevents the change from taking effect.

In response to a selection by a supervisory user of an option 307.4 to delegate authority to a third device, the authorization device 100A displays a screen (e.g., similar to FIG. 3.4) providing a list of delegates to whom authority may be transmitted. In response to a selection of one of the delegates, the authorization device 100A transmits an indication to the device 100A of the selected delegate that they have authority to continue or terminate the restricted mode of operation, and thus allow or block the requested change.

FIG. 3.8 illustrates a screen 308 providing a notification 308.1 that the user with user_name is attempting share either a link to a content file or a content file with another device, and providing an option 308.2 to allow the sharing, and an option 308.3 to block the sharing. These options may be examples of predetermined criteria (1) and (8) as described above. In one embodiment, the notification 308.1 indicates the intended recipient of the shared content, for example by user name or email address, and an includes a further indication whether that intended recipient has been determined to be on a preapproved or pre-disapproved list of recipients (the list pre-approved and pre-disapproved recipients may be stored in the user account module 152). In response to a selection by a supervisory user of an option 308.2 to allow the sharing, the authorization device 100A transmits a response to the restricted device 100B including an indication that the attempted sharing is to be allowed. Responsive to the indication, the restricted device 100B shares the selected file with the designated other device. In response to a selection by a supervisory user of an option 308.3 to block the sharing, the authorization device 100A transmits a response to the restricted device 100B including an indication that the attempted sharing is to be blocked. Responsive to the indication, the restricted device 100B prevents the file from being shared.

In response to a selection by a supervisory user of an option 308.4 to delegate authority to a third device, the authorization device 100A displays a screen (e.g., similar to FIG. 3.4) providing a list of delegates to whom authority may be transmitted. In response to a selection of one of the delegates, the authorization device 100A transmits an indication to the device 100A of the selected delegate that they have authority to continue or terminate the restricted mode of operation, and thus allow or block the requested sharing.

In one embodiment, the indications received by the authorization device 100A are stored in a local memory for a predetermined amount of time, such as twenty-four hours. The user of the authorization device 100A can access the received indications and approve them or block either individually or in one or more batches. For each indication stored, information can be displayed on the authorization device 100A showing the amount of time that the user of the restricted device 100B has accessed a particular content file.

In one embodiment, an authorization device 100A provides a screen with a dashboard display indicating for each device 100B that is being managed by the authorization device 100A, whether they are operating in restricted mode or unrestricted mode. FIG. 3.9 illustrates an example screen 309 listing a plurality of users of devices 100B, along with a control 309.1 for each as to whether the user's device 100B is operating in restricted mode or not, and an expiration time 309.2 or amount of time left in the restricted mode, and a control 309.3 for setting other criteria for operation of the restricted device 100B. The user of the authorization device 100A can selectively enable or disable the control 309.1 for each user's restricted device 100B, including setting expiration time 309.2. In response to a selection by a supervisory user of an control 309.1 to activate restricted model on a specific device, the authorization device 100A transmits an indication to the identified restricted device 100B that restricted mode is activated. Responsive to the indication, the restricted device 100B begins operation in the restricted mode and stores the expiration time 309.2 (or other selected predetermined criteria) in the user account module 152. Likewise, in response to a selection by a supervisory user of an control 309.1 to deactivate restricted model on a specific device, the authorization device 100A transmits an indication to the identified restricted device 100B that unrestricted mode is activated. Responsive to the indication, the restricted device 100B begins operation in the unrestricted mode.

In another embodiment, an authorization device 100A provides notification and control over a plurality of restricted devices 100B concurrently. One example for this embodiment is an authorization device 100A used by teacher in conjunction with a plurality of restricted devices 100B used by students in a classroom. In this embodiment, the teacher, as the user of the authorization device 100A can specify for the entire group at once the predetermined criteria for the restricted mode, as well as the criteria for termination and continuation of the mode. Thus, each student user would be able to work independently while at the same time all of the restricted devices 100B having either group-wide restricted mode operation with either common and/or individual criteria specified by the teacher. This is beneficial, for example, the restricted mode of operation blocks sharing of content; a student can request to share a document, with another student, and the teacher's authorization device 100A would receive a notification of such an attempt as described at step 206 for FIG. 2; the teacher could then select an option (step 212) to allow the sharing.

The disclosure herein has been described in particular detail with respect to possible embodiments. Those of skill in the art will appreciate that other embodiments may be practiced, and that any individual embodiment disclosed herein may be combined with any other (or several others) embodiment(s). Thus, unless stated otherwise, embodiments are not mutually exclusive.

The particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

Some portions of above description present features in terms of algorithms and symbolic representations of operations on information. These algorithmic descriptions and representations are the means used by those skilled in the data processing arts to convey the substance of their work most effectively to others skilled in the art. These operations, while described functionally or logically, are understood to be necessarily implemented by computer programs. Furthermore, it has also proven convenient at times, to refer to these arrangements of operations as modules or by functional names, without loss of generality.

It will also be understood that, although the terms first, second, etc. may be used herein to describe various elements, these elements should not be limited by these terms. These terms are only used to distinguish one element from another. For example, a first user interface could be termed a second user interface, and, similarly, a second user interface could be termed a first user interface, without departing from the scope of the present invention. The first user interface and the second user interface are both user interfaces, but they are not the same user interface.

The terminology used in the description of the invention herein is for the purpose of describing particular embodiments only. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context. In all embodiments, these types of steps are performed by computer programs and instructions of a computer system, or similar electronic computing device, and not by any mental steps, and do not require human judgment or decision making. These steps manipulate and transform data represented as physical (electronic) quantities within the computer system memories or registers or other such information storage, transmission or display devices.

Certain aspects of the embodiments disclosed herein include process steps and instructions described herein in the form of an algorithm. It should be noted that these process steps and instructions are embodied in software, firmware or hardware, and when embodied in software, could be downloaded to reside on and be operated from different platforms used by real-time network operating systems.

Finally, it should be noted that the language used in the specification has been principally selected for readability and instructional purposes, and may not have been selected to delineate or circumscribe the inventive subject matter. Accordingly, the disclosure herein is intended to be illustrative, but not limiting, of the scope of the invention, which is set forth in the following claims.

The invention claimed is:

1. A method, comprising:
at a first electronic device, configured to operate in a plurality of restricted modes, with one or more processors and memory:
operating the first electronic device in a first restricted mode, during which a first set of permitted applications stored on the first electronic device are executable;
while the first electronic device is operating in the first restricted mode:
in response to detecting satisfaction of a termination condition of the first restricted mode indicating that a usage limit associated with the first restricted mode has been exceeded, transmitting from the first electronic device a request to continue the first restricted mode on the first electronic device to one or more authorization devices that are configured to authorize continuation of the plurality of restricted modes on the first electronic device; and
after transmitting the request to continue the first restricted mode, receiving by the first electronic device from at least one of the authorization devices an indication indicating a second restricted mode has been authorized according to predetermined criteria, selected by a user of one of the authorization devices, wherein the predetermined criteria correspond to a second set of permitted applications stored on the first electronic device, wherein the first set of permitted applications is different from the second set of permitted applications;
responsive to receiving the indication associated with the second restricted mode, operating the first electronic device in the second restricted mode according to the predetermined criteria, during which the second set of permitted applications stored on the first electronic device are executable.

2. The method of claim 1, wherein operating the first electronic device in a first restricted mode further comprises:
automatically operating the first electronic device in the first restricted mode based upon an assigned role of the user of the first electronic device.

3. The method of claim 1, wherein operating the first electronic device in a first restricted mode further comprises:
automatically operating the first electronic device in the first restricted mode without notification to the user of the first electronic device that the first electronic device is operating in the first restricted mode.

4. The method of claim 1, wherein operating the first electronic device in the second restricted mode further comprises:
restricting operation of the first electronic device by the predetermined criteria to access a first set of permitted data, and to prevent from accessing a second set of restricted data.

5. The method of claim 1, wherein the predetermined criteria further correspond to at least one of: (1) number of accesses to a permitted application or data file; (2) completion of specified prior accesses to a permitted application or permitted data; (3) application for a permitted or restricted application; (4) website URL domain, or website category; and (5) entering a collaboration state between the first electronic device and a second, different electronic device.

6. The method of claim 1, operating the first electronic device in a first restricted mode further comprises:
upon activation of the first electronic device, requesting by the first electronic device from a network based server, the predetermined criteria from an account of a user of one of the authorization devices that is stored on the network based server;
receiving by the first electronic device from the network based server the predetermined criteria; and
determining by the first electronic device whether to operate the first electronic device in the first restricted mode or in an unrestricted mode based on the predetermined criteria.

7. The method of claim 1, operating the first electronic device in a first restricted mode further comprises:
operating the first electronic device to accept a first subset of physical inputs and to ignore a second, different subset of physical inputs.

8. The method of claim 1, wherein transmitting from the first electronic device the request to continue the first restricted mode on the first electronic device to one or more authorization devices that are configured to authorize continuation of the plurality of restricted modes on the first electronic device further comprises:
automatically transmitting from the first electronic device a request to continue the first restricted mode on the first electronic device, without displaying on the first electronic device any notification of the transmitted request.

9. The method of claim 1, wherein transmitting from the first electronic device the request to continue the first restricted mode on the first electronic device to one or more authorization devices that are configured to authorize continuation of the plurality of restricted modes on the first electronic device further comprises:

displaying a screen on the first electronic device notifying the user that the first restricted mode has terminated, and providing at least one option to request a continuation of the first restricted mode.

10. The method of claim 1, wherein the predetermined criteria further correspond to at least one of:

reception by the first electronic device from an authorization device of an indication to repeat playback of a previously selected content file;

reception by the first electronic device from an authorization device of an indication to playback a different, selected content file;

reception by the first electronic device from an authorization device of an indication of a permitted application to be executed by the first electronic device;

reception by the first electronic device from an authorization device of an indication to allow a change in an operational setting of the first electronic device;

reception by the first electronic device from an authorization device of an indication to block a change in an operational setting of the first electronic device;

reception by the first electronic device from an authorization device of an indication to allow a sharing of a content file by the first electronic device with a different electronic device; and reception by the first electronic device from an authorization device of an indication to block a sharing of a content file by the first electronic device with a different electronic device.

11. The method of claim 1, wherein at least one of the second set of permitted applications is different from at least one of the first set of permitted applications.

12. The method of claim 1, wherein at least one of the first set of permitted applications is no longer executable while operating the first electronic device in the second restricted mode during which the second set of permitted applications stored on the first electronic device are executable.

13. The method of claim 1, wherein the usage limit associated with the first restricted mode is based on at least one of: expiration of a timer, completion of a content access on the first electronic device, a change in settings of the first electronic device, content sharing from the first electronic device to a second, different electronic device, and aggregate usage history of the first electronic device.

14. A non-transitory computer readable storage medium storing one or more programs, the one or more programs comprising instructions, which when executed by a first electronic device configured to operate in a plurality of restricted modes and having one or more processors, a memory and a display, cause the first electronic device to perform the steps of:

operating the first electronic device in a first restricted mode, during which a first set of permitted applications stored on the first electronic device are executable;

while the first electronic device is operating in the first restricted mode:

in response to detecting satisfaction of a termination condition of the first restricted mode indicating that a usage limit associated with the first restricted mode has been exceeded, transmitting from the first electronic device a request to continue the first restricted mode on the first electronic device to one or more authorization devices that are configured to authorize continuation of the plurality of restricted modes on the first electronic device; and after transmitting the request to continue the first restricted mode, receiving by the first electronic device from at least one of the authorization devices an indication indicating a second restricted mode has been authorized according to predetermined criteria, selected by a user of one of the authorization devices, wherein the predetermined criteria correspond to a second set of permitted applications stored on the first electronic device, wherein the first set of permitted applications is different from the second set of permitted applications;

responsive to receiving the indication associated with the second restricted mode, operating the first electronic device in the second restricted mode according to the predetermined criteria, during which the second set of permitted applications stored on the first electronic device are executable.

15. The non-transitory computer readable storage medium of claim 14, wherein at least one of the second set of permitted applications is different from at least one of the first set of permitted applications.

16. The non-transitory computer readable storage medium of claim 14, wherein at least one of the first set of permitted applications is no longer executable while operating the first electronic device in the second restricted mode during which the second set of permitted applications stored on the first electronic device are executable.

17. The non-transitory computer readable storage medium of claim 14, wherein operating the first electronic device in the second restricted mode further comprises:

restricting operation of the first electronic device by the predetermined criteria to access a first set of permitted data, and to prevent from accessing a second set of restricted data.

18. The non-transitory computer readable storage medium of claim 14, wherein the usage limit associated with the first restricted mode is based on at least one of: expiration of a timer, completion of a content access on the first electronic device, a change in settings of the first electronic device, content sharing from the first electronic device to a second, different electronic device, and aggregate usage history of the first electronic device.

19. A first electronic device comprising:

non-transitory memory;

one or more processors; and one or more programs stored in the non-transitory memory for execution by the one or more processors, the one or more programs including instructions to perform the steps of:

operating the first electronic device in a first restricted mode, during which a first set of permitted applications stored on the first electronic device are executable;

while the first electronic device is operating in the first restricted mode:

in response to detecting satisfaction of a termination condition of the first restricted mode indicating that a usage limit associated with the first restricted mode has been exceeded, transmitting from the first electronic device a request to continue the first restricted mode on the first electronic device to one or more authorization devices that are configured to authorize continuation of a plurality of restricted modes on the first electronic device; and after transmitting the request to continue the first restricted mode, receiving by the first electronic device from at least one of the authorization devices an indication indicating a second restricted mode has been authorized according to predetermined criteria, selected by a user of one of the authorization devices, wherein the predetermined criteria correspond to a second set of permitted applications stored on the first electronic device, wherein the first set of permitted applications is different from the second set of permitted applications;

responsive to receiving the indication associated with the second restricted mode, operating the first electronic device in the second restricted mode according to the predetermined criteria, during which the second set of permitted applications stored on the first electronic device are executable.

20. The first electronic device of claim 19, wherein at least one of the second set of permitted applications is different from at least one of the first set of permitted applications.

21. The first electronic device of claim 19, wherein at least one of the first set of permitted applications is no longer executable while operating the first electronic device in the second restricted mode during which the second set of permitted applications stored on the first electronic device are executable.

22. The first electronic device of claim 19, wherein operating the first electronic device in the second restricted mode further comprises:

restricting operation of the first electronic device by the predetermined criteria to access a first set of permitted data, and to prevent from accessing a second set of restricted data.

23. The first electronic device of claim 19, wherein the usage limit associated with the first restricted mode is based on at least one of: expiration of a timer, completion of a content access on the first electronic device, a change in settings of the first electronic device, content sharing from the first electronic device to a second, different electronic device, and aggregate usage history of the first electronic device.

* * * * *